United States Patent
Perroni-Scharf et al.

(10) Patent No.: US 11,972,534 B2
(45) Date of Patent: Apr. 30, 2024

(54) MODIFYING MATERIALS OF THREE-DIMENSIONAL DIGITAL SCENES UTILIZING A VISUAL NEURAL NETWORK

(71) Applicant: Adobe Inc., San Jose, CA (US)

(72) Inventors: Maxine Perroni-Scharf, Princeton, NJ (US); Yannick Hold-Geoffroy, San Jose, CA (US); Kalyan Sunkavalli, San Jose, CA (US); Jonathan Eisenmann, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 277 days.

(21) Appl. No.: 17/519,841

(22) Filed: Nov. 5, 2021

(65) Prior Publication Data

US 2023/0141395 A1     May 11, 2023

(51) Int. Cl.
  *G06T 19/20*     (2011.01)
  *G06F 18/211*    (2023.01)
  (Continued)

(52) U.S. Cl.
  CPC ............ *G06T 19/20* (2013.01); *G06F 18/211* (2023.01); *G06F 18/22* (2023.01); *G06N 3/02* (2013.01);
  (Continued)

(58) Field of Classification Search
  CPC . G06T 19/20; G06T 15/04; G06T 2219/2004; G06T 2219/2016; G06T 11/00; G06T 2219/2012; G06T 2219/2024; G06F 18/211; G06F 18/22; G06N 3/02; G06N 3/0464; G06N 3/08; G06N 3/045
  See application file for complete search history.

(56) References Cited

U.S. PATENT DOCUMENTS 9,697,416 B2   7/2017  Shen et al.
10,192,115 B1*  1/2019  Sheffield ................ G06N 20/00
(Continued)

OTHER PUBLICATIONS

J. Liao, Y. Yao, L. Yuan, G. Hua and S. B. Kang, "Visual attribute transfer through deep image analogy", ACM Trans. Graph., vol. 36, No. 4, pp. 1-15, 2017. (Year: 2017).*

(Continued)

*Primary Examiner* — Andrae S Allison
(74) *Attorney, Agent, or Firm* — Keller Preece PLLC

(57) ABSTRACT

Methods, systems, and non-transitory computer readable storage media are disclosed for utilizing a visual neural network to replace materials in a three-dimensional scene with visually similar materials from a source dataset. Specifically, the disclosed system utilizes the visual neural network to generate source deep visual features representing source texture maps from materials in a plurality of source materials. Additionally, the disclosed system utilizes the visual neural network to generate deep visual features representing texture maps from materials in a digital scene. The disclosed system then determines source texture maps that are visually similar to the texture maps of the digital scene based on visual similarity metrics that compare the source deep visual features and the deep visual features. Additionally, the disclosed system modifies the digital scene by replacing one or more of the texture maps in the digital scene with the visually similar source texture maps.

20 Claims, 15 Drawing Sheets

(51) Int. Cl.
*G06F 18/22* (2023.01)
*G06N 3/02* (2006.01)
*G06T 15/04* (2011.01)

(52) U.S. Cl.
CPC ...... *G06T 15/04* (2013.01); *G06T 2219/2004* (2013.01); *G06T 2219/2016* (2013.01)

(56) References Cited

U.S. PATENT DOCUMENTS

| | | | | |
|---|---|---|---|---|
| 10,665,011 | B1* | 5/2020 | Sunkavalli | G06N 3/084 |
| 11,461,992 | B2* | 10/2022 | Vitek | G06V 10/255 |
| 11,557,107 | B2* | 1/2023 | Krishnamoorthy | G06V 30/422 |
| 2015/0015574 | A1* | 1/2015 | Prahalad | G06T 15/04 |
| | | | | 345/420 |
| 2020/0013212 | A1* | 1/2020 | Wang | G06T 13/40 |
| 2021/0343051 | A1* | 11/2021 | Hasan | G06T 11/001 |
| 2021/0343080 | A1* | 11/2021 | Kim | G06T 17/20 |
| 2022/0172427 | A1* | 6/2022 | Lino | G06T 15/205 |
| 2022/0261972 | A1* | 8/2022 | Wang | G06V 10/82 |

OTHER PUBLICATIONS

O. Texler et al., "Interactive video stylization using few-shot patch-based training", ACM Trans. Graph., vol. 39, No. 4, 2020 . . . (Year: 2020).*

M. Perroni-Scharf, K. Sunkavalli, J. Eisenmann and Y. Hold-Geoffroy, "Material Swapping for 3D Scenes using a Learnt Material Similarity Measure," 2022 IEEE/CVF Conference on Computer Vision and Pattern Recognition Workshops (CVPRW), New Orleans, LA, USA, 2022, pp. 2033-2042, (Year: 2022).*

Melendez, Francho, et al. "Transfer of albedo and local depth variation to photo-textures." Proceedings of the 9th European Conference on Visual Media Production. 2012. (Year: 2012).*

Yang et al, A Multi-Domain and Multi-Modal Representation Disentangler for Cross-Domain Image Manipulation and Classification, IEEE Transactions On Image Processing, vol. 29, 2020 (Year: 2020).*

Liu et al, Multi-Domain and Multi-Task Learning for Human Action Recognition, IEEE Transactions On Image Processing, vol. 28, No. 2, Feb. 2019 (Year: 2019).*

Zhou et al, Towards Multi-Domain Face Synthesis Via Domain-Invariant Representations and Multi-Level Feature Parts, IEEE Transactions On Multimedia, vol. 24, 2022 (Year: 2022).*

Liu et al, Transfer learning of deep material network for seamless structure-property predictions, Computational Mechanics (2019) 64:451-465 (Year: 2019).*

Sanzharov, V. V., V. A. Frolov, and A. G. Voloboy. "Variable photorealistic image synthesis for training dataset generation." (2020).

Moehrmann, Julia, and Gunther Heidemann. "Efficient annotation of image data sets for computer vision applications." Proceedings of the 1st International Workshop on Visual Interfaces for Ground Truth Collection in Computer Vision Applications. 2012.

Tsirikoglou, Apostolia, et al. "Procedural modeling and physically based rendering for synthetic data generation in automotive applications." arXiv preprint arXiv:1710.06270 (2017).

Shi, Liang, et al. "Match: differentiable material graphs for procedural material capture." ACM Transactions on Graphics (TOG) 39.6 (2020): 1-15. Part 1.

Shi, Liang, et al. "Match: differentiable material graphs for procedural material capture." ACM Transactions on Graphics (TOG) 39.6 (2020): 1-15. Part 2.

Simonyan et al. in Very Deep Convolutional Networks for Large-Scale Image Recognition, Computer Vision and Pattern Recognition 2014.

* cited by examiner

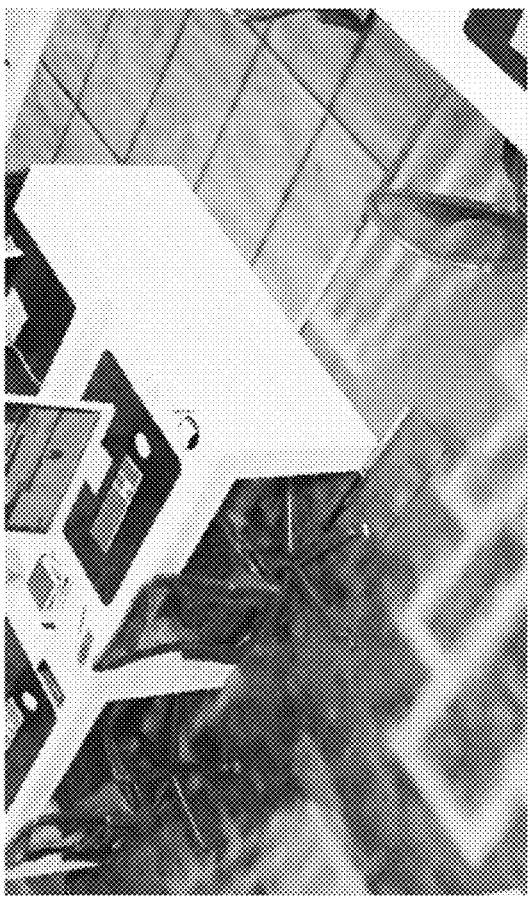
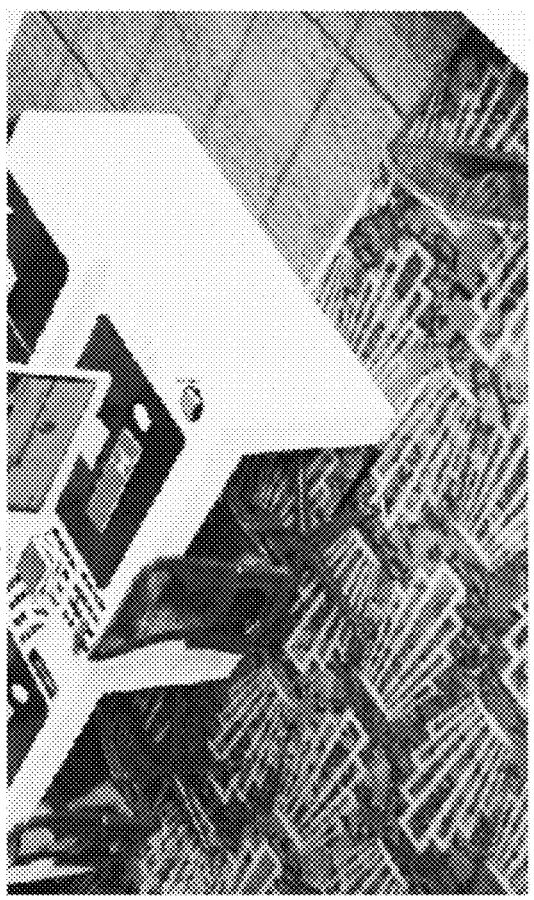
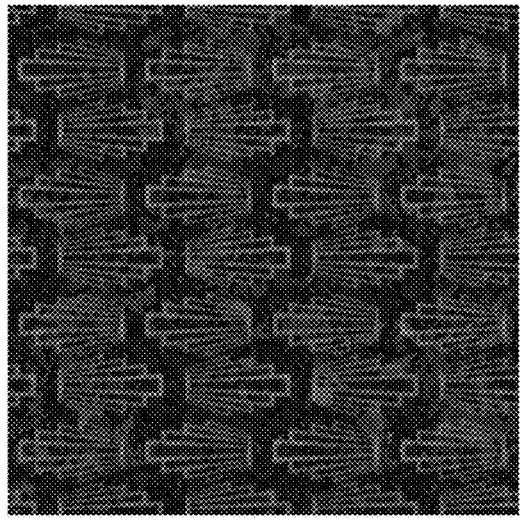
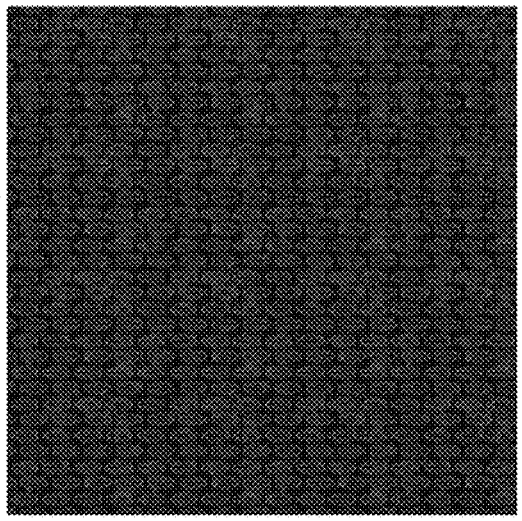
Fig. 5B

MODIFYING MATERIALS OF THREE-DIMENSIONAL DIGITAL SCENES UTILIZING A VISUAL NEURAL NETWORK

BACKGROUND

Recent years have seen significant advancement in hardware and software platforms used for generating digital imagery, such as digital three-dimensional models. For example, three-dimensional models are used in a wide variety of different industries (e.g., movies, video games, architecture, product visualization). Additionally, photorealistic three-dimensional models are becoming more prevalent in training and using machine-learning models involving object detection and scene understanding. By generating datasets of synthesized digital images including three-dimensional models with a range of different materials, many systems are able to increase the availability of resources for use across the different industries. Furthermore, increasing the size and variation of these synthesized datasets improves the flexibility and accuracy of machine-learning models for understanding different scenes and recognizing objects across different domains. Conventional systems, however, suffer from a number of shortcomings with regard to accurately and efficiently extending the size and variability of synthesized datasets including three-dimensional models.

SUMMARY

This disclosure describes one or more embodiments of methods, non-transitory computer readable media, and systems that solve the foregoing problems (in addition to providing other benefits) by converting physically-based-rendering (PBR) materials in a three-dimensional scenes to procedural materials. Once the PBR materials have been replaced with procedural materials, the disclosed systems are able to adjust the parameters of the procedural materials to produce material variations. Specifically, the disclosed systems utilize a visual neural network to generate source deep visual features representing source texture maps from procedural materials of a procedural material database. Additionally, the disclosed systems utilize the visual neural network to generate deep visual features representing texture maps from materials in a digital scene. The disclosed systems then determine source texture maps that are visually similar to the texture maps of the digital scene based on visual similarity metrics that compare the source deep visual features and the deep visual features. Additionally, the disclosed systems modify the digital scene by replacing one or more of the texture maps in the digital scene with the visually similar source texture maps. The disclosed systems thus replace materials in a digital scene to flexibly, accurately, and efficiently generate synthesized digital images.

BRIEF DESCRIPTION OF THE DRAWINGS

Various embodiments will be described and explained with additional specificity and detail through the use of the accompanying drawings in which:

FIG. 5B illustrates diagrams comparing a texture map and a modified version of the texture map in accordance with one or more implementations.

DETAILED DESCRIPTION

Figure 1:
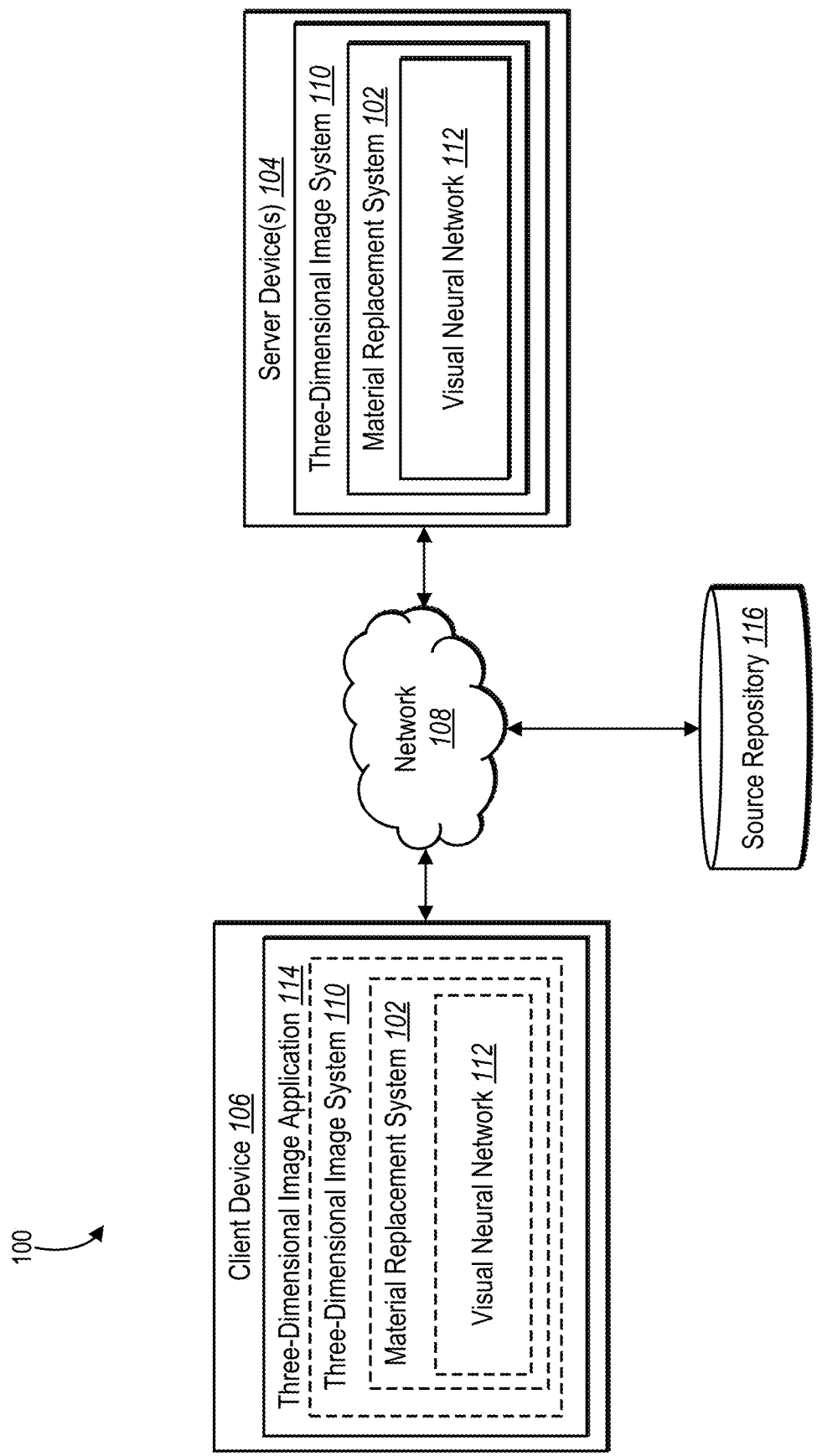
FIG. 1 illustrates an example system environment in which a material replacement system operates in accordance with one or more implementations.

This disclosure describes one or more embodiments of a material replacement system that replaces materials in a digital scene with visually similar materials from a source dataset. In one or more embodiments, the material replacement system utilizes a visual neural network to generate deep visual features of materials in a three-dimensional digital scene and a source dataset. The material replacement system then determines materials that are visually similar to the materials from the digital scene by comparing the deep visual features of the materials in the three-dimensional digital scene and source deep visual features in the source dataset. Additionally, the material replacement system modifies the digital scene by replacing the materials of objects in the digital scene with the visually similar materials from the source dataset.

As mentioned, in one or more embodiments, the material replacement system utilizes a visual neural network to generate deep visual features of materials in three-dimensional scenes and source dataset. For example, the material replacement system extracts texture maps from procedural materials in a source database. In some embodiments, the material replacement system extracts source texture maps such as albedo maps from source materials that provide visual textures for rendering objects with the source materials. The material replacement system then utilizes the visual neural network to generate deep visual features representing the extracted source texture maps.

According to one or more embodiments, the material replacement system augments the materials in the source dataset. For instance, the material replacement system generates additional material variants based on the materials in the source dataset. To illustrate, the material replacement system generates the material variants by modifying one or more characteristics of the materials to create new materials that are similar to the materials in the source dataset. The material replacement system thus increases the overall number of materials in the source dataset.

In one or more additional embodiments, the material replacement system also extracts materials of objects in a digital scene. For example, the material replacement system extracts texture maps such as albedo maps from materials that provide visual textures for rendering the objects in the digital scene. The material replacement system utilizes the visual neural network to generate deep visual features representing the extracted texture maps from the digital scene.

In some embodiments, after generating deep visual features from materials source dataset and materials in a digital scene, the material replacement system determines source materials that are perceptually similar to the materials in the digital scene. Specifically, the material replacement system determines visual similarity metrics by comparing the source deep visual features for the materials in the source dataset and the deep visual features for the materials in the digital scene. For example, the material replacement system determines a Euclidean distance between each pair of source deep visual features and deep visual features. The material replacement system then selects one or more corresponding texture maps from the source materials based on the visual similarity metrics. Additionally, in some embodiments, the material replacement system selects corresponding texture maps from the augmented source dataset including variant materials.

In one or more embodiments, the material replacement system modifies a digital scene by replacing materials in the digital scene with perceptually similar materials from source materials. In particular, in response to determining a set of corresponding texture maps from the source dataset based on the visual similarity metrics, the material replacement system replaces the texture maps in the digital scene with the corresponding texture maps. For example, the material replacement system replaces texture maps in a material graph associated with the digital scene with the corresponding texture maps from the source dataset.

According to additional embodiments, the material replacement system generates a plurality of synthesized digital images including a digital scene based on perceptually similar materials. For instance, the material replacement system determines a plurality of alternative texture maps from the source materials for texture maps in the digital scene. The material replacement system then generates a plurality of synthesized digital images by rendering the digital scene with the plurality of alternative texture maps (e.g., different texture maps for each synthesized digital image). The material replacement system is thus able to augment a dataset of synthesized digital images by generating a plurality of different digital images from a single digital scene using materials with perceptually similar styles.

Conventional image processing systems have a number of shortcomings in relation to flexibility, efficiency, and accuracy of operation. For example, many conventional image processing systems provide tools for users to generate and modify three-dimensional scenes. While these conventional systems provide users with the flexibility to generate and modify three-dimensional scenes according to their own preferences, manually editing three-dimensional scenes is a difficult and time-consuming process, especially for large and complex scenes. Accordingly, such conventional systems are inefficient, because they lack the ability to quickly generate new three-dimensional scenes for content creators or for generating/augmenting large datasets of images (e.g., for use in training machine-learning models).

Additionally, some conventional image processing systems that automatically generate or modify three-dimensional digital images lack accuracy. For instance, some conventional systems generate/modify digital images by randomly replacing (or otherwise inserting) textures or materials via random selection of new textures/materials. These conventional systems are unable to create digital images that have perceptually consistent or realistic themes across objects or account for different texture scales and orientations/rotations on objects of varying sizes.

Furthermore, conventional image processing systems that automatically generate or modify digital images also lack flexibility. In particular, the conventional systems usually rely on prior knowledge about three-dimensional scenes to generate modified versions of the scenes. To illustrate, the conventional systems rely on semantic tags on objects and materials in the scenes. Thus, if a scene lacks semantic tags or other indicators that provide identifying information for the objects and materials in a scene, the conventional systems are typically unable to accurately generate synthesized data consistent with the three-dimensional scene without first annotating the objects and materials.

The disclosed material replacement system provides a number of advantages over conventional systems. For example, the material replacement system improves the flexibility of computing systems that generate synthesized digital image from three-dimensional models. Specifically, in contrast to conventional systems that are limited to generating/modifying digital images with prior knowledge of a scene, the material replacement system utilizes a visual neural network to learn features of materials in a digital scene even in the absence of prior knowledge of the digital scene. More specifically, the material replacement system utilizes the learned features of the materials to select perceptually similar materials from a set of existing materials in a source dataset.

The material replacement system also improves the accuracy of computing systems that modify three-dimensional scenes. In particular, the material replacement system provides accurate generation of three-dimensional scenes that are consistent within the scene and with the original scene. For instance, the material replacement system utilizes the learned features of materials in a digital scene to determine perceptually similar materials from a source dataset. The material replacement system also improves the accuracy by augmenting the source materials by generating variants of the materials in the source dataset. The material replacement system thus provides accurate detection of similar materials in a source database and augmented material dataset to avoid overlooking a particular material due to default parameters of the material being perceptually distant from the scene material. The material replacement system also accurately handles variations in scale and orientation/rotation by separately determining deep visual features of scaled/rotated versions of the source materials for replacing existing materials in a scene.

Additionally, the material replacement system improves the efficiency of computing systems that modify three-dimensional scenes. For example, by precomputing deep visual features of materials in a source dataset via a visual neural network, the material replacement system quickly compares learned deep visual features of materials in a digital scene to the precomputed visual features of materials via visual similarity metrics. The material replacement system is then able to swap out the existing materials in the digital scene with perceptually similar materials from the source dataset without sacrificing significant processing speed.

Turning now to the figures, FIG. 1 includes an embodiment of a system environment 100 in which a material replacement system 102 is implemented. In particular, the system environment 100 includes server device(s) 104 and a client device 106 in communication via a network 108. Moreover, as shown, the server device(s) 104 include a three-dimensional image system 110, which includes the material replacement system 102. As further illustrate in FIG. 1, the material replacement system 102 includes a visual neural network 112. Additionally, the client device 106 includes a three-dimensional image application 114, which optionally includes the three-dimensional image system 110 and the material replacement system 102, which further includes the visual neural network 112. FIG. 1 further illustrates that the system environment 100 includes a source repository 116.

As shown in FIG. 1, in one or more implementations, the server device(s) 104 includes or hosts the three-dimensional image system 110. Specifically, the three-dimensional image system 110 includes, or is part of, one or more systems that implement digital image processing. For example, the three-dimensional image system 110 provides tools for viewing, generating, editing, and/or otherwise interacting with digital images including three-dimensional models. To illustrate, the three-dimensional image system 110 communicates with the client device 106 via the network 108 to provide the tools for display and interaction via the three-dimensional image application 114 at the client device 106. Additionally, in some embodiments, the three-dimensional image system 110 receives data from the client device 106 in connection with editing digital images, including requests to access digital images stored at the server device(s) 104 (or at another device such as the source repository 116) and/or requests to store digital images from the client device 106 at the server device(s) 104 (or at another device). In some embodiments, the three-dimensional image system 110 receives interaction data for viewing, generating, or editing a digital image from the client device 106, processes the interaction data (e.g., to view, generate, or edit a digital image), and then provides the results of the interaction data to the client device 106 for display via the three-dimensional image application 114 or to a third-party system.

In one or more embodiments, a digital image or a digital scene includes a representation of a three-dimensional scene. For example, a digital scene includes a plurality of objects arranged in a three-dimensional environment having three-dimensional axes. Additionally, a digital scene includes materials associated with objects in the three-dimensional environment for determining how the digital scene renders in a rendering pipeline. For example, a material assigned to an object in a digital scene includes a texture map that includes information for determining a color and surface properties of the object that affect how the object appears in a rendering of the digital image. Accordingly, different materials assigned to objects in a digital image cause different rendering effects after rendering the digital image. In one or more embodiments, a synthesized digital image includes a rendered version (e.g., a two-dimensional version) of a digital scene including objects in a three-dimensional model.

In one or more embodiments, the three-dimensional image system 110 provides tools for replacing materials in digital scenes with textures from source materials. In particular, the three-dimensional image system 110 utilizes the material replacement system 102 to extract materials from a digital scene. For example, in connection with replacing materials in a digital scene with other materials from a set of source materials, the material replacement system 102 accesses a plurality of source materials from the source repository 116. The material replacement system 102 extracts texture maps by recursively tracing a material graph or other scene data structure that indicates the materials assigned to each object in the digital scene.

In one or more embodiments, a source material includes an existing material from which the material replacement system 102 obtains texture maps. In one or more implementations, a source material comprises a procedural material. In alternative implementations, a source material is a digital material with associated texture maps but is not a procedural material. For example, in one or more implementations, the material replacement system 102 extracts digital materials from source digital scenes. The material replacement system 102 then stores the digital materials in the source repository 116.

A procedural material is represented as node graphs, where each node may denote simple image processing operations, but the collective graph can produce texture maps (like albedo, normal, roughness, etc.) for highly complex, real-world spatially varying bidirectional reflectance distribution functions (BRDFs). Procedural materials have a number of advantages: they are compact in memory, resolution-independent, can be evaluated efficiently for interactive feedback during the material design process, and can be easily edited to generate material variations. Using such procedural materials typically provides an editable, memory-compact, resolution-independent alternative to storing and using a full rendering of the digital material.

In one or more embodiments, the material replacement system 102 learns visual features of source materials and digital scenes utilizing a visual neural network. For example, as illustrated in FIG. 1, the material replacement system 102 includes the visual neural network 112 to generate source deep visual features that represent visual characteristics of materials of the source database. Furthermore, the material replacement system 102 utilizes the visual neural network 112 to generate deep visual features that represent visual characteristics of materials extracted from a digital scene. In one or more embodiments, a deep visual feature (or a source deep visual feature) includes one or more encoded feature vectors (in some cases a large number of concatenated feature vectors) generated by the visual neural network 112 to represent a particular material in a source material or a digital scene.

The material replacement system 102 then utilizes the deep visual features extracted from the source materials and a digital scene to determine materials from the source materials that are perceptually similar to the materials in the digital scene. According to one or more embodiments, the material replacement system 102 determines visual similarity metrics that indicate the perceptual similarity of materials based on the deep visual features corresponding to the materials. After determining a set of materials from the source materials that correspond to the materials in the digital scene, the material replacement system 102 replaces the materials in the digital scene with the corresponding materials from the source materials. In particular, the material replacement system 102 replaces one or more texture maps used to render the digital scene with one or more source texture maps. Accordingly, the material replacement system 102 generates one or more modified digital scenes including the modified materials for the objects in the digital scene.

In one or more embodiments, after modifying a digital scene by replacing materials in the digital scene with source materials, the material replacement system 102 provides the modified digital scene to the client device 106 via the network 108. For instance, the three-dimensional image system 110 provides the modified digital scene for rendering at the client device 106 on a display device using the three-dimensional image application 114. Additionally, in some embodiments, the client device 106 receives additional inputs to further modify the digital scene, such as inputs to modify one or more objects (e.g., a shape or position) or one or more materials assigned to objects in the digital scene. The client device 106 then sends data to the three-dimensional image system 110 for further modifying the digital scene (e.g., utilizing the material replacement system 102) and then provides the further modified digital scene to the client device 106 for display.

In additional embodiments, the material replacement system 102 or the three-dimensional image system 110 renders a modified digital scene to generate a synthesized digital image. For example, the three-dimensional image system 110 generates a synthesized digital image from a modified digital scene to include in a dataset of digital images. To illustrate, the three-dimensional image system 110 provides the synthesized digital image to the source repository 116 (or to another system) for inclusion in the source materials for use in modifying additional scenes and/or for training machine-learning models. In some embodiments, the material replacement system 102 generates a plurality of different modified versions of a digital scene by replacing materials in the digital scene for use in a training dataset for training a machine-learning model on different materials.

In additional embodiments, the material replacement system 102 determines replacement materials for providing to a content creator in connection with a digital scene. To illustrate, in response to a request from the client device 106 for one or more replacement materials for one or more materials in a digital scene generated at the client device 106, the material replacement system 102 utilizes the visual neural network 112 to determine a set of corresponding source materials. The material replacement system 102 then modifies the digital scene for providing to the client device 106 based on the corresponding source materials. Alternatively, the material replacement system 102 provides the corresponding source materials to the client device 106 for selection by the content creator and modification of the digital scene based on the selection.

In one or more embodiments, the server device(s) 104 include a variety of computing devices, including those described below with reference to FIG. 9. For example, the server device(s) 104 includes one or more servers for storing and processing data associated with digital images. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 9. Furthermore, although not shown in FIG. 1, the client device 106 is operated by a user (e.g., a user included in, or associated with, the system environment 100) to perform a variety of functions. In particular, the client device 106 performs functions such as, but not limited to, accessing, viewing, and interacting with a variety of digital content (e.g., digital images such as three-dimensional scenes). In some embodiments, the client device 106 also performs functions for generating, capturing, or accessing data to provide to the three-dimensional image system 110 and the material replacement system 102 in connection with replacing materials in digital scenes. For example, the client device 106 communicates with the server device(s) 104 via the network 108 to provide information (e.g., user interactions) associated with illuminating digital vector images. Although FIG. 1 illustrates the system environment 100 with a single client device 106, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 9.

Although FIG. 1 illustrates the server device(s) 104 and the client device 106 communicating via the network 108, in alternative embodiments, the various components of the system environment 100 communicate and/or interact via other methods (e.g., the server device(s) 104 and the client device 106 can communicate directly). Furthermore, although FIG. 1 illustrates the material replacement system 102 being implemented by a particular component and/or device within the system environment 100, the material replacement system 102 can be implemented, in whole or in part, by other computing devices and/or components in the system environment 100 (e.g., the client device 106).

In particular, in some implementations, the material replacement system 102 on the server device(s) 104 supports the material replacement system 102 on the client device 106. For instance, the material replacement system 102 on the server device(s) 104 generates or trains the material replacement system 102 (e.g., the visual neural network 112). The server device(s) 104 provides the trained material replacement system 102 to the client device 106. In other words, the client device 106 obtains (e.g., downloads) the material replacement system 102 from the server device(s) 104. At this point, the client device 106 is able to utilize the material replacement system 102 to replace materials in a digital scene independently from the server device(s) 104.

In alternative embodiments, the material replacement system 102 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform digital scene generation and material replacement operations, and, in response, the material replacement system 102 or the three-dimensional image system 110 on the server device(s) 104 performs operations to generate and/or edit digital scenes. The server device(s) 104 then provide the output or results of the operations to the client device 106.

Figure 2:
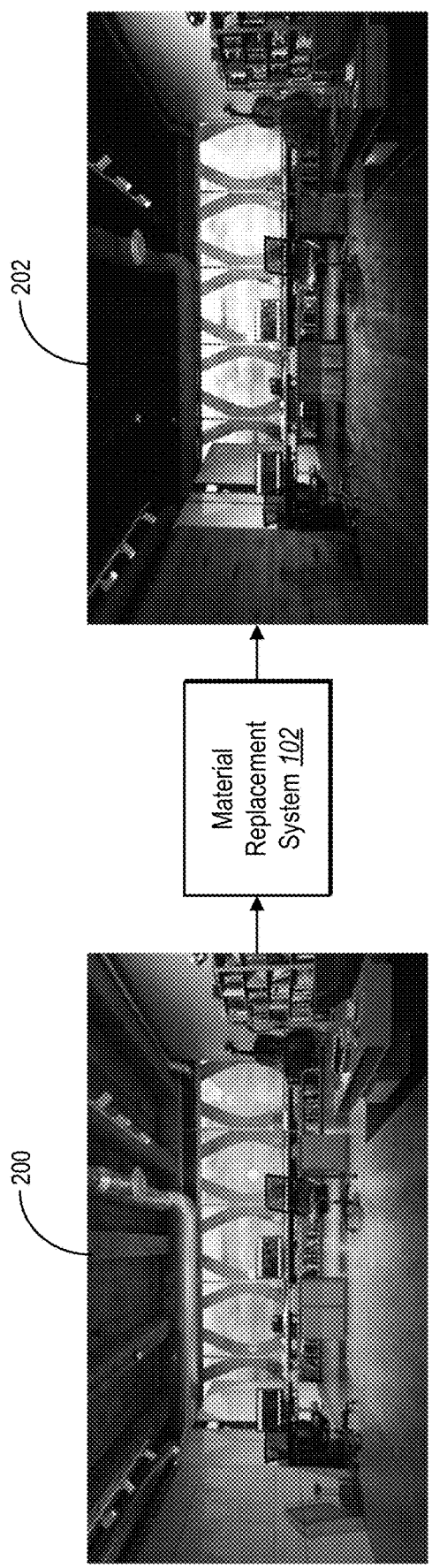
FIG. 2 illustrates a diagram of the material replacement system generating a modified digital scene by replacing materials from a digital scene in accordance with one or more implementations.

As mentioned, the material replacement system 102 replaces materials in a digital scene with perceptually similar materials from a set of source materials. FIG. 2 illustrates the material replacement system 102 processing a digital scene 200 to generate a modified digital scene 202. Specifically, the material replacement system 102 replaces materials assigned to a plurality of objects in the digital scene 200 with materials extracted from a plurality of source materials.

In one or more embodiments, the material replacement system 102 extracts source materials from the objects in a plurality of source materials. For example, the material replacement system 102 extracts texture maps from the source materials. In one or more implementations, the material replacement system 102 extracts texture maps from source procedural materials. Alternatively, the material replacement system 102 extracts source materials from a plurality of different three-dimensional scenes including various objects with a number of different materials. In some embodiments, the material replacement system 102 obtains the source materials from a general database of three-dimensional scenes that include materials for objects in the three-dimensional scenes.

In one or more embodiments, the material replacement system 102 then determines replacement materials for the digital scene 200. Specifically, the material replacement system 102 learns visual features of the materials in the source materials (e.g., utilizing a visual neural network). Additionally, the material replacement system 102 learns visual features of the materials in the digital scene 200 (e.g., utilizing the visual neural network). The material replacement system 102 then determines the replacement materials by comparing the learned visual features of the materials in the source materials and the learned visual features of the materials in the digital scene.

After determining the replacement materials, the material replacement system 102 generates the modified digital scene 202. In particular, the material replacement system 102 replaces one or more materials for one or more objects in the digital scene 200 with one or more replacement materials determined based on the learned visual features. For instance, the material replacement system 102 modifies the one or more materials by changing the materials in a material graph or in other scene structure data indicating the materials of the objects in the digital scene 200. Accordingly, the material replacement system 102 generates the modified digital scene 202 to include the one or more modified materials for the one or more objects in the digital scene 200. FIG. 2 illustrates an embodiment in which the material replacement system 102 replaces a plurality of materials of a plurality of objects. As shown by FIG. 2, the resultant modified digital scene 202 includes a cohesive scene that appears realistic. In particular, the material replacement system 102 replaces the materials of the digital scene 200 with corresponding source materials with similar visual features resulting in plausible materials without having to know a label or class of the material being replaced.

Figure 3:
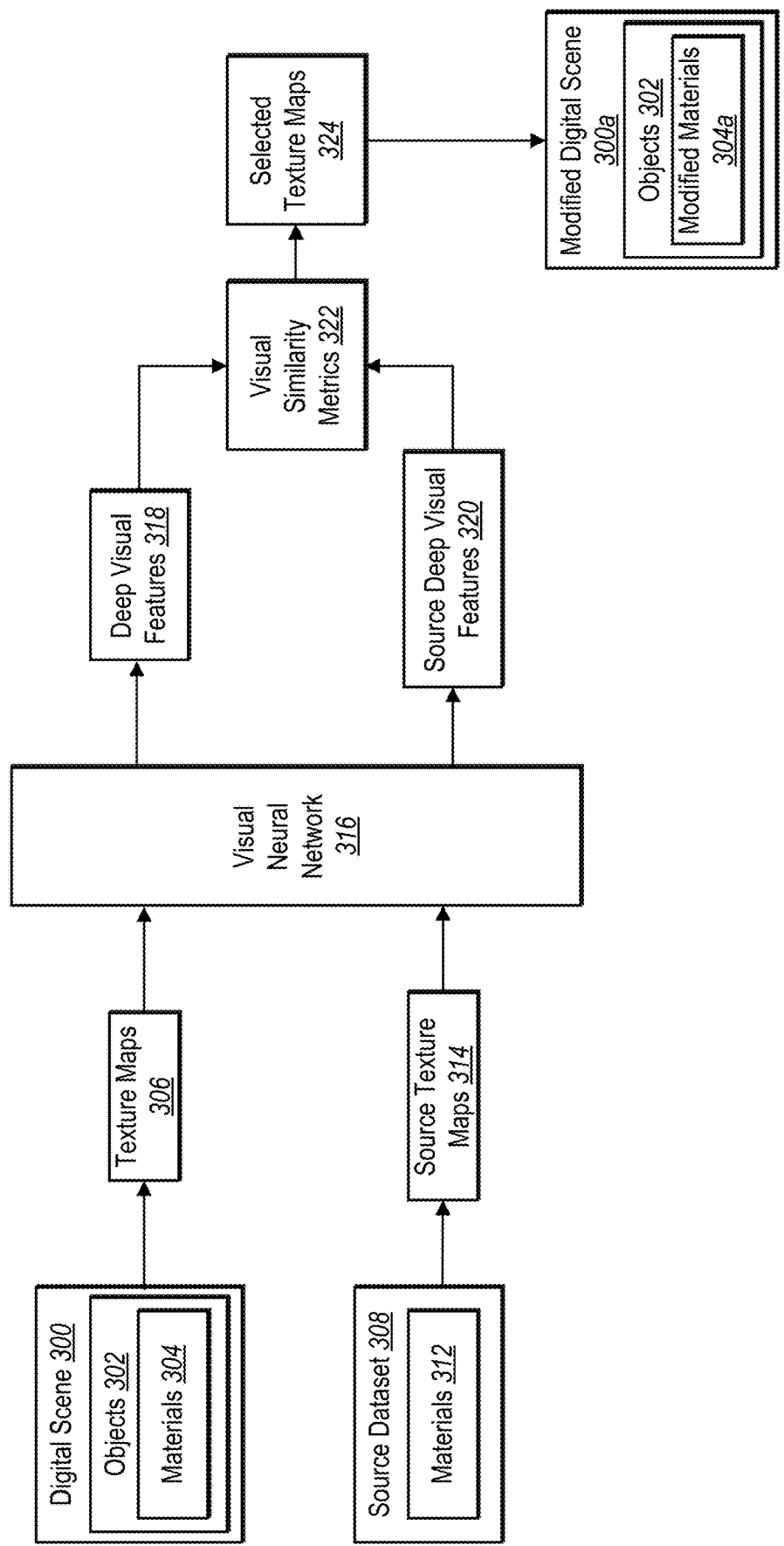
FIG. 3 illustrates a diagram of the material replacement system utilizing a visual neural network to determine source albedo maps for replacing albedo maps in a digital scene in accordance with one or more implementations.

FIG. 3 illustrates a detailed overview of a material replacement process in which the material replacement system 102 modifies a digital scene 300 by replacing materials in the digital scene 300. Specifically, FIG. 3 illustrates that the digital scene 300 includes a plurality of objects 302. For example, the objects 302 include a plurality of three-dimensional elements arranged in a three-dimensional space based on coordinates for a plurality of three-dimensional vertices forming the three-dimensional elements. To illustrate, the objects can include elements such as furniture, animals, people, structures, etc.

Additionally, as illustrated in FIG. 3, the digital scene 300 includes materials 304 associated with the objects 302. For instance, as previously mentioned, a digital scene includes materials that determine how a rendering pipeline renders the digital scene on a display device. In one or more embodiments, a material of an object indicates properties of an object such as color, surface textures, transparency, reflectance, etc. A material includes one or more maps that indicate the various properties of the object across one or more portions of an object. To illustrate, a material includes one or more texture maps (albedo map, a normal map, a roughness map, a metalness map, etc.) to indicate how light interacts (e.g., via ray-tracing simulations) with a particular object/object surface during rendering of the digital scene 300 at a rendering resolution. In some embodiments, materials in a digital scene form a material graph (or other scene data structure) to produce bidirectional reflectance distribution functions (BRDFs) for producing photorealistic effects from three-dimensional models.

In one or more embodiments, the material replacement system 102 extracts one or more texture maps from the digital scene 300 based on the materials 304 of the objects 302. For example, as illustrated in FIG. 3, the material replacement system 102 extracts texture maps 306 (e.g., albedo maps) from the materials 304. To illustrate, the material replacement system 102 extracts the albedo maps from a subset of materials in the digital scene 300. According to one or more embodiments, the albedo maps include pixel maps representing the base color values for each of the objects 302 in the digital scene 300. More specifically, an albedo map generally indicates the visible color texture of an object absent other light-based properties of the objects.

FIG. 3 also illustrates a source database 308 includes a plurality of materials 312. In addition to extracting the texture maps 306 from the digital scene 300, FIG. 3 illustrates that the material replacement system 102 extracts source texture maps 314 from the materials 312 of the source database 308. For example, the material replacement system 102 accesses a material graph for each of the materials 312 in the source database 308 and then extracts the source texture maps 314 from the accessed materials 312. Alternatively, the material replacement system 102 accesses the materials 312 in another scene data structure such as metadata or a set of related files associated with the source database 308 and then extracts the source texture maps 314.

After extracting the texture maps 306 from the digital scene 300 and the source texture maps 314 from the source database 308, the material replacement system 102 determines visual features of the texture maps 306 and the source texture maps 314. In one or more embodiments, the material replacement system 102 utilizes a visual neural network 316 to determine the visual features of the texture maps 306 and the source texture maps 314. In one or more embodiments, a neural network includes a computer representation that is tuned (e.g., trained) based on inputs to approximate unknown functions. For instance, a neural network includes one or more layers or artificial neurons that approximate unknown functions by analyzing known data at different levels of abstraction. In some embodiments, a neural network includes one or more neural network layers including, but not limited to, a deep learning model, a convolutional neural network, a recurrent neural network, a feed forward neural network, a generative neural network, an adversarial neural network, or a combination of a plurality of neural network types. In one or more embodiments, a visual neural network includes, but is not limited to, a plurality of neural network layers to determine visual features (e.g., in visual feature tensors) of a digital image (e.g., a texture map) based on the visual characteristics of the digital image. According to at least some embodiments, the visual neural network 316 includes a pre-trained neural network comprising a plurality of convolutional neural network layers, a plurality of fully-connected layers, and a plurality of hidden layers.

In one or more implementations, the visual neural network 316 is a neural network trained to perform image recognition. More specifically, in one or more implementations, the visual neural network 316 is a deep convolution neural network trained to perform an image recognition task. For example, in one or more implementations the visual neural network 316 comprises a cascaded convolution neural network as described in U.S. Pat. No. 9,697,416, entitled Object Detection Using Cascaded Convolutional Neural Networks, the entire contents of which are hereby incorporated by reference. In another implementations, the visual neural network 316 comprises a VGG neural network as described by Simonyan et al. in *Very Deep Convolutional Networks for Large-Scale Image Recognition*, Computer Vision and Pattern Recognition 2014, arXiv:1409.1556, the entire contents of which are hereby incorporated by reference.

As illustrated in FIG. 3, the material replacement system 102 utilizes the visual neural network 316 to generate deep visual features 318 from the texture maps 306. For instance, the material replacement system 102 generates the deep visual features 318 by processing the texture maps 306 utilizing the visual neural network 316 and then extracting the features of a particular size from a penultimate layer of the visual neural network 316. To illustrate, in the case of a pre-trained neural network, the material replacement system 102 extracts the deep visual features 318 from a convolutional neural network layer of the visual neural network 316 (and prior to a classification or final activation layer of the visual neural network 316). Alternatively, the material replacement system 102 trains a new visual neural network to generate the deep visual features 318 as an output at a final layer of the visual neural network.

The term deep neural feature refers to a latent feature of a digital material. In particular, a deep neural feature refers to a latent feature of a digital material extracted from a deep neural network, such as a deep convolutional neural network. For example, a deep neural feature, in one or more implementations, includes a latent feature extracted from a texture map. In one or more embodiments, a deep neural feature corresponds to a visual appearance of a digital image (e.g., a visual appearance of a digital material presented in a digital image). In one or more implementations, a deep neural feature corresponds to features unrelated to visual appearance as well.

FIG. 3 further illustrates that the material replacement system 102 utilizes the visual neural network 316 to generate source deep visual features 320 from the source texture maps 314. For example, the material replacement system 102 encodes perceptual features of the source texture maps 314 by generating the source deep visual features 320 utilizing the visual neural network 316. In one or more embodiments, as shown, the material replacement system 102 utilizes the same visual neural network to generate the deep visual features 318 and the source deep visual features 320. Alternatively, the material replacement system 102 utilizes different instances of a single visual neural network to generate the deep visual features 318 and the source deep visual features 320.

According to one or more embodiments, the material replacement system 102 then determines whether the materials 304 in the digital scene 300 are perceptually similar to one or more of the materials 312 in the source database 308. Specifically, the material replacement system 102 compares determines visual similarity metrics 322 that indicate the perceptual similarity of the texture maps 306 and the source texture maps 314. For instance, the material replacement system 102 compares the deep visual features 318 to the source deep visual features 320 to determine the visual similarity metrics 322. In one or more embodiments, the material replacement system 102 determines the visual similarity metrics 322 by determining a Euclidean distance between each deep visual feature and source deep visual feature pair. In alternative embodiments, the material replacement system 102 utilizes a cosine distance or a Gram matrix distance as the visual similarity metrics 322.

As illustrated in FIG. 3, the material replacement system 102 determines selected texture maps 324 from the source texture maps 314 based on the perceptual similarity of the source texture maps 314 to the texture maps 306. For example, the material replacement system 102 determines, for each texture map from the digital scene 300, one or more source texture maps that are close to the texture map based on the corresponding visual similarity metric. For example, in one or more embodiments, the material replacement system 102 selects a plurality of source albedo maps for each albedo map, such as by selecting a predetermined number of closest source albedo maps or by selecting a number of source albedo maps within a threshold distance.

In some embodiments, the material replacement system 102 also selects one or more variants of a source texture map in the selected texture maps 324. To illustrate, the material replacement system 102 generates variants for the source texture maps 314 by modifying one or more characteristics (e.g., modifiable material parameters corresponding to each of the materials 312) of the source texture maps 314. In additional examples, the material replacement system 102 generates variants by modifying a scale and/or an orientation/rotation of each source texture map. The material replacement system 102 generates source deep visual features for the variants of the source texture maps 314 and then compares the source deep visual features of the variants to the deep visual features 318.

Once the material replacement system 102 has determined the selected texture maps 324, the material replacement system 102 then generates a modified digital scene 300a. In particular, the material replacement system 102 replaces the materials 304 in the digital scene 300 with the modified materials 304a based on the selected texture maps 324. For instance, the material replacement system 102 replaces the texture maps 306 with the corresponding texture maps from the selected texture maps 324. In one or more embodiments, the material replacement system 102 generates the modified materials 304a by replacing the albedo maps with the selected source albedo maps in a material graph or in another scene data structure that ties the materials 304 to the objects 302. Accordingly, the resulting modified digital scene 300a includes the modified materials 304a to indicate to a rendering pipeline to render the modified digital scene 300a with the modified materials 304a.

Although FIG. 3 illustrates that the material replacement system 102 extracts texture maps from materials in a digital scene and source materials, in other embodiments, the material replacement system 102 extracts additional maps or components of the materials. For instance, the material replacement system 102 extracts a plurality of maps from each material in a digital scene or a source material including, but not limited to, a normal map, a specularity map, a roughness map, or a metalness map. The material replacement system 102 then utilizes a visual neural network to generate deep visual features for the extracted elements of the materials, such as by generating deep visual features for each individual map and then concatenating all features for the maps corresponding to a single material. Alternatively, the material replacement system 102 changing the input to the visual neural network to incorporate all maps for a single material (e.g., by increasing the number of channels into one or more of the layers of the visual neural network).

Figure 4A:
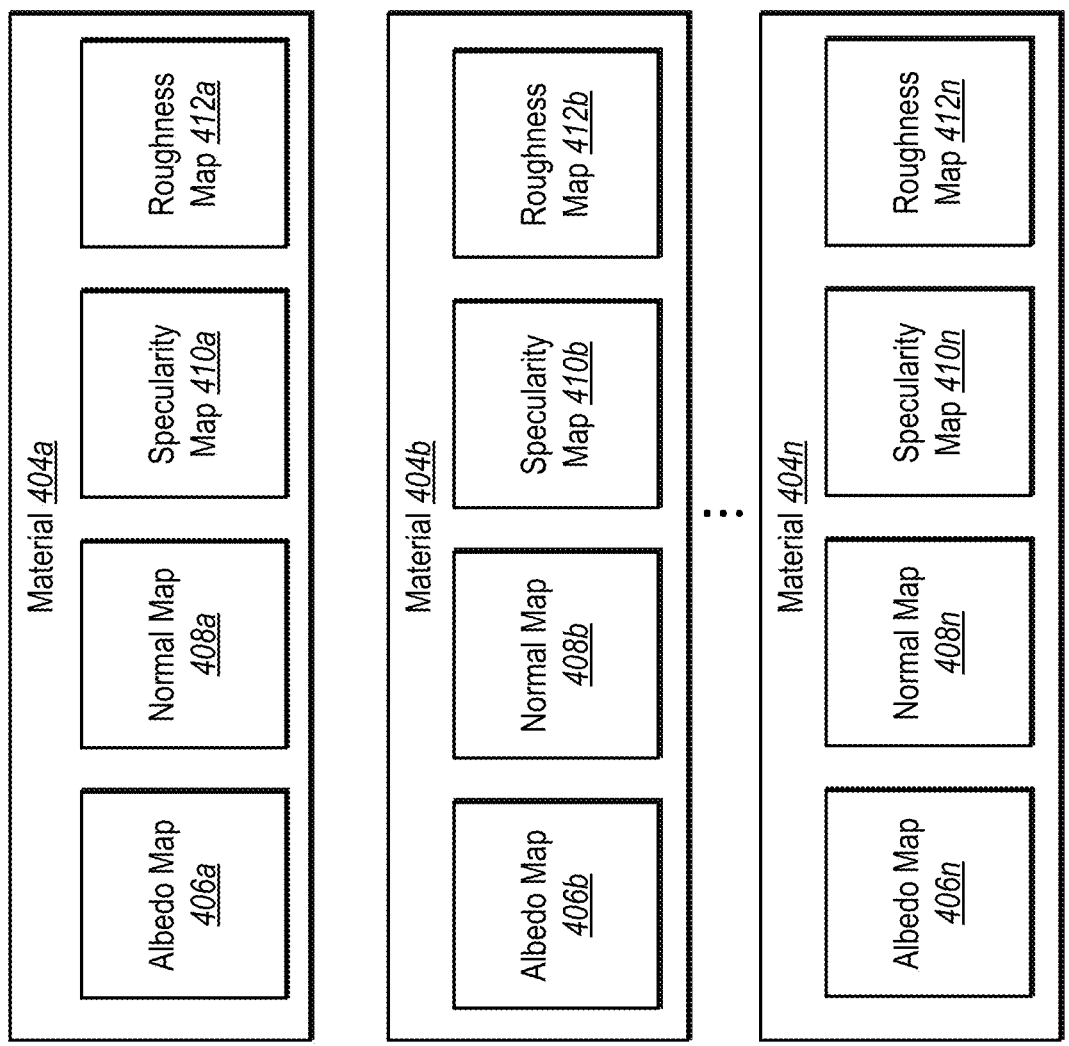
FIGS. 4A-4F illustrate diagrams for extracting and determining albedo maps for replacing the albedo maps in the digital scene in accordance with one or more implementations.
Figure 4B:
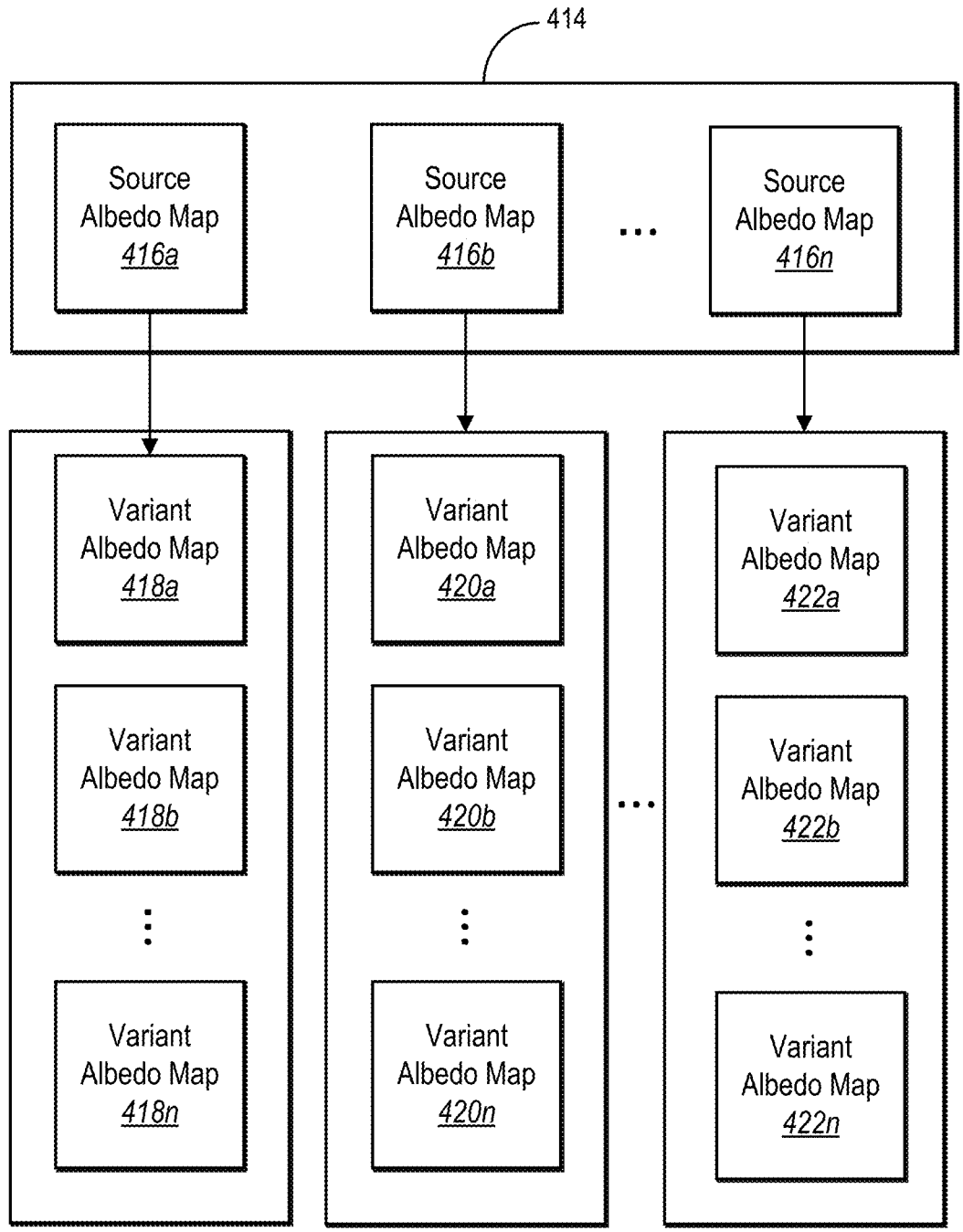
Figure 4C:
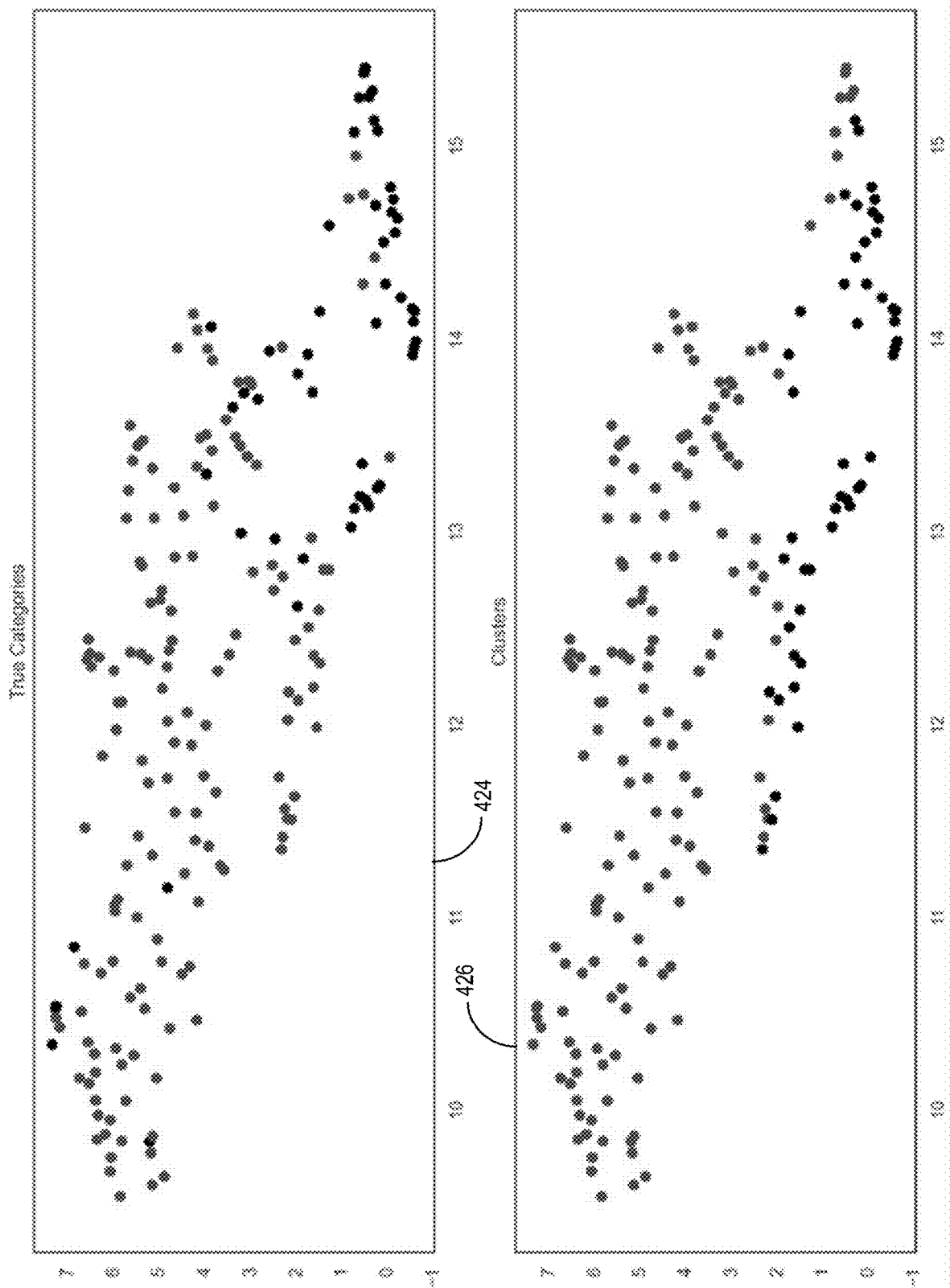
Figure 4D:
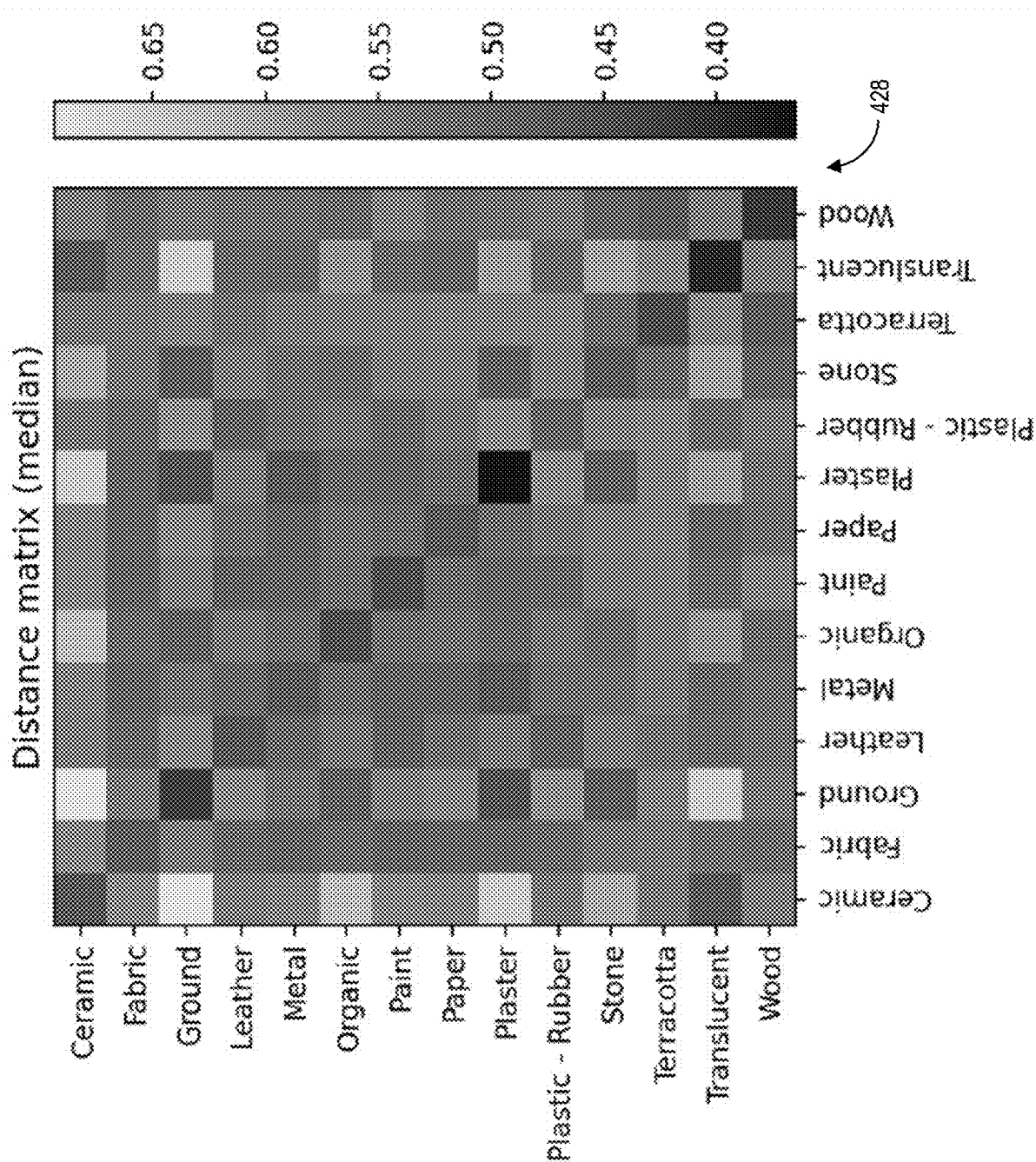
Figure 4E:
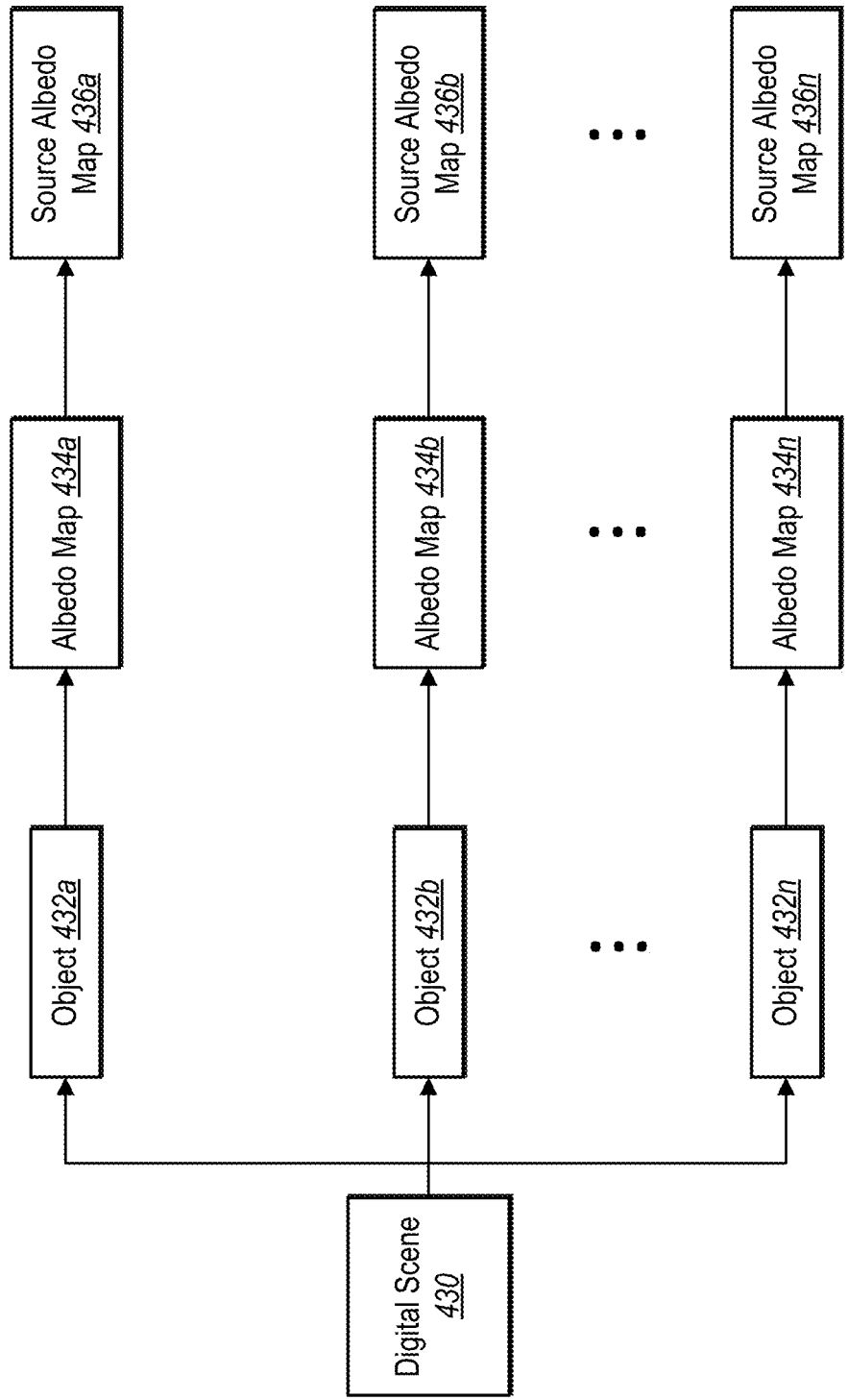
Figure 4F:
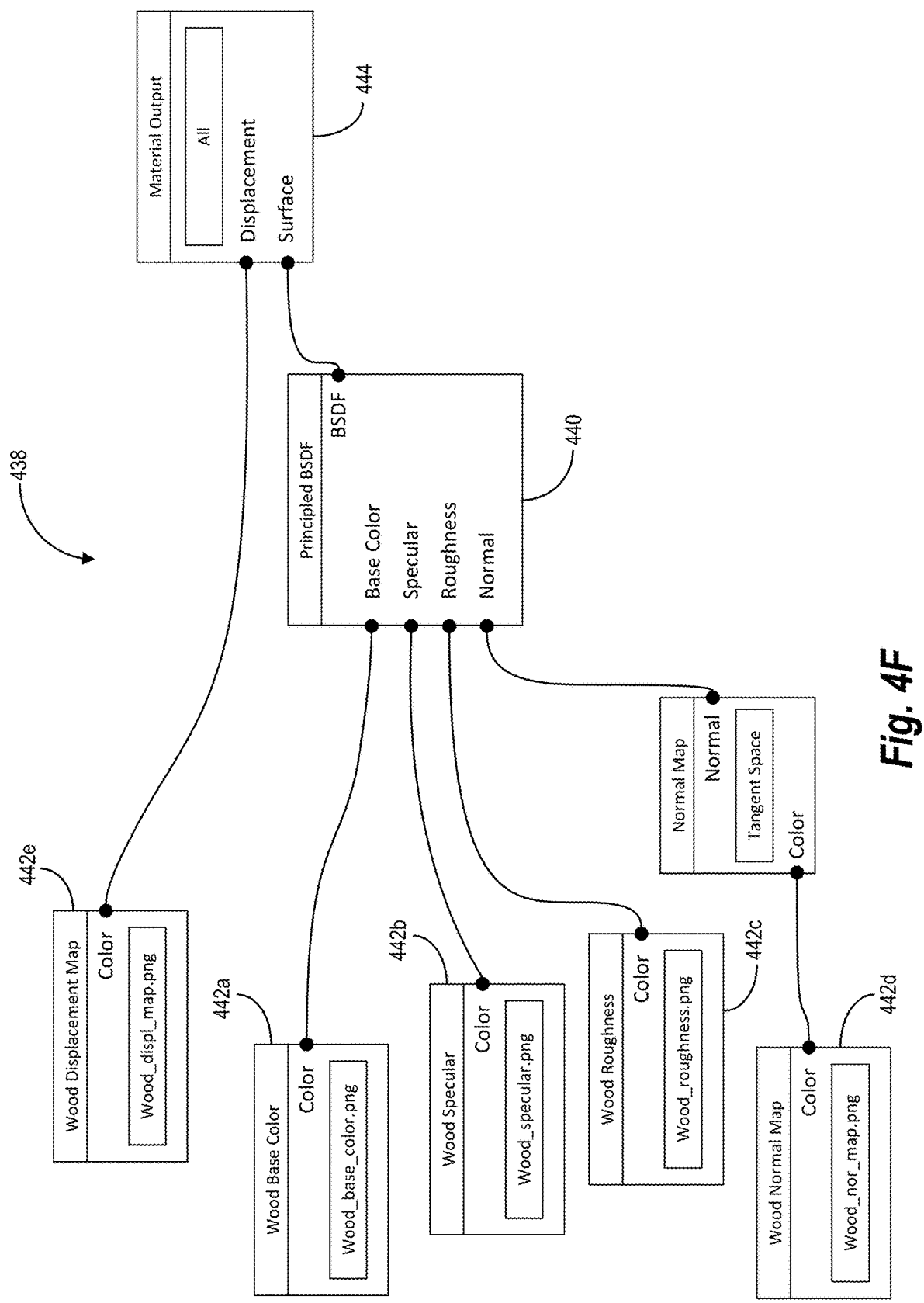

FIGS. 4A-4F illustrate diagrams including additional detail in the material replacement process of FIG. 3. For example, FIG. 4A illustrates a diagram in which the material replacement system 102 extracts texture maps from a source material. FIG. 4B illustrates a diagram in which the material replacement system 102 determines a set of source albedo maps and variants that are perceptually similar to albedo maps in a digital scene. FIGS. 4C-4D illustrates diagrams of a plurality of different visual similarity metrics based on generated feature representations of texture maps. Furthermore, FIG. 4E illustrates a diagram in which the material replacement system 102 replaces albedo maps from a digital scene with perceptually similar source albedo maps. FIG. 4F illustrates a material graph including a plurality of material nodes corresponding to a material in a digital scene.

As illustrated in FIG. 4A, a material includes a plurality of texture maps that define texture parameters of a corresponding object for rendering the object in certain lighting conditions. Specifically, as illustrated, the source materials 404a-404n include albedo maps 406a-406n, normal maps 408a-408n, specularity maps 410a-410n, and roughness maps 412a-412n. In three-dimensional models that utilize physically-based rendering (PBR) materials for photorealistic scenes, different types of materials can include different maps based on the object type and desired rendering characteristics for each object. More specifically, plastics, metals, and fabrics have different material characteristics that result in different responses to light interacting with the surfaces. Accordingly, while FIG. 4A illustrates specific texture maps, the maps can be different for different materials. To illustrate, some materials include metalness maps for metallic materials, while other materials may not include metalness maps.

In one or more embodiments, the material replacement system 102 extracts a specific type of texture map from materials for use in modifying materials in a digital scene. To illustrate, in the embodiment of FIG. 4A, the material replacement system 102 extracts the albedo maps 406a-406n from the materials 404a-404n. The material replacement system 102 then utilizes the albedo maps 406a-406n for replacing albedo maps in a digital scene. In one or more additional embodiments, the material replacement system 102 extracts additional maps (e.g., specularity maps or normal maps) from materials for use in modifying materials in a digital scene. In one or more implementations, the source materials 404a-404n comprise procedural materials as described above.

After extracting one or more texture maps from source materials, the material replacement system 102 determines source texture maps that are perceptually similar to materials in a digital scene. Additionally, the material replacement system 102 determines a set of source texture maps for replacing the materials in the digital scene with the perceptually similar texture maps from the source materials. FIG. 4B illustrates a set of texture maps 414 that the material replacement system 102 determines are perceptually similar to texture maps in a digital scene.

For example, as illustrated in FIG. 4B, the material replacement system 102 determines a plurality of source albedo maps 416a-416n that correspond to albedo maps in a digital scene. Specifically, as previously mentioned, the material replacement system 102 utilizes a visual neural network to generate deep visual features for extracted source albedo maps and albedo maps extracted from the digital scene. The material replacement system 102 then compares the deep visual features corresponding to the source albedo maps and the deep visual features corresponding to the albedo maps from the digital scene to determine the set of texture maps 414 utilizing one or more visual similarity metrics.

In addition to determining the source albedo maps 416a-416n as part of the set of texture maps 414, in one or more embodiments, the material replacement system 102 also determines variants of the source albedo maps 416a-416n. For instance, as illustrated in FIG. 4B, the material replacement system 102 generates variant albedo maps for each of the source albedo maps. To illustrate, the material replacement system 102 generates a first plurality of variant albedo maps 418a-418n corresponding to a first source albedo map 416a, a second plurality of variant albedo maps 420a-420n corresponding to a second source albedo map 416b, etc., and an nth plurality of variant albedo maps 422a-422n corresponding to an nth source albedo map 416n.

In one or more embodiments, the material replacement system 102 generates the variant albedo maps by modifying parameterized characteristics of the source albedo maps. Specifically, the material replacement system 102 modifies characteristics such as hue/contrast/lighting, texture size (e.g., grain size of wood textures), roughness, sheen, tint, etc., to generate certain variants of a source albedo map. In additional embodiments, the material replacement system 102 generates different tiled variants of a source albedo map by modifying a scale and orientation/rotation of a source albedo map. In some embodiments, the material replacement system 102 generates the tiled variants only after determining the set of texture maps 414 corresponding to texture maps in a digital scene.

In addition to generating the variant albedo maps, the material replacement system 102 also generates variant texture maps for other texture attributes of each material. For example, in response to generating a tiled version of an albedo map, the material replacement system 102 also generates tiled versions of a normal map, a specular map, a roughness map, etc. Thus, the material replacement system 102 produces a plurality of consistent variants of texture maps for a given material.

In one or more embodiments, the material replacement system 102 also avoids replacing transparent materials with incompatible materials. To illustrate, the material replacement system 102 utilizes an opacity heuristic based on the average pixel color of opacity maps corresponding to the materials. In response to determining that a particular material has an opacity map with an average opacity RGB value greater than a threshold value (e.g., 0.05), the material replacement system 102 excludes source materials with opacity below the threshold value before selecting the set of texture maps 414.

In some embodiments, the material replacement system 102 generates deep visual features for each of the source albedo maps and one or more of the variant albedo maps corresponding to a source albedo map. For instance, the material replacement system 102 generates deep visual features for variant albedo maps generated by modifying parameterized characteristics of the source albedo maps. In additional embodiments, the material replacement system 102 generates deep visual features for variant albedo maps that are tiled variants of the source albedo maps.

In alternative embodiments, the material replacement system 102 generates deep visual features for certain types of variant albedo maps (e.g., tiled variants) and not for other types of variant albedo maps (e.g., parameterized variants). In such cases, the material replacement system 102 determines a set of corresponding albedo maps for a digital scene from an original set of source albedo maps and from the variant albedo maps for which the material replacement system 102 generated deep visual features (e.g., the tiled variants). The material replacement system 102 then automatically adds the variant texture maps excluded from the deep visual features to the set of corresponding albedo maps (e.g., the parameterized variants).

As described above, in one or more embodiments, the material replacement system 102 determines source texture maps that are perceptually similar to texture maps in a digital scene based on visual similarity metrics. Specifically, the material replacement system 102 determines the visual similarity metrics by comparing source deep visual features of the source texture maps to deep visual features of the texture maps. FIGS. 4C-4D illustrate a plurality of visualizations corresponding to different visual similarity metrics. Specifically, FIG. 4C illustrates graph diagrams corresponding to plotted values based on a cosine distance metric and a Euclidean distance metric. FIG. 4D illustrates a Gram matrix including values based on perceptual distance.

In particular, FIG. 4C illustrates a first graph diagram 424 illustrates plotted values of a cosine distance metric and a second graph diagram 426 corresponding to plotted values of Euclidean distance metric based on deep visual features generated utilizing a visual neural network for two categories of texture maps-ceramic and fabric. As shown in the second graph diagram 426, the Euclidean distance metric clusters the features into two visually distinct clusters (indicated by the light plotted points and the dark plotted points). Additionally, as the first graph diagram 424 indicates, the clusters determined by the cosine distance metric are less visibly distinct. FIG. 4D illustrates a Gram matrix 428 indicating a plurality of different texture categories based on deep visual features generated for a plurality of texture maps utilizing a visual neural network.

In one or more embodiments, the material replacement system 102 utilizes a Euclidean distance metric to compare perceptual similarity of texture maps. In alternative embodiments, the material replacement system 102 utilizes another distance metric (e.g., a cosine distance metric or a Gram distance metric) based on the features or categories of the texture maps. For example, a certain distance metric may perform better than another distance metric depending on the characteristics of the texture maps or other materials being compared.

After determining a set of source texture maps for replacing texture maps in a digital scene, in one or more embodiments, the material replacement system 102 replaces the texture maps with the source texture maps. FIG. 4E illustrates that a digital scene 430 includes a plurality of objects 432a-432n in a three-dimensional scene. In one or more embodiments, the digital scene 430 includes a user-generated digital scene that a creator of the digital scene desires to modify. Alternatively, the digital scene 430 includes a synthetically generated digital scene or a digital scene obtained from a dataset.

Additionally, FIG. 4E illustrates that albedo maps 434a-434n are assigned to the objects 432a-432n in the digital scene. In particular, the albedo maps 434a-434n indicate to a rendering pipeline how to render the objects on a display device according to lighting conditions in the digital scene 430. For example, the albedo maps 434a-434n provide textures corresponding to the objects 432a-432n based on the object types, such that floors, walls, furniture, and other objects have textures that correspond to the particular object types.

In one or more embodiments, the material replacement system 102 utilizes source albedo maps 436a-436n to replace the albedo maps 434a-434n in the digital scene 430. To illustrate, the material replacement system 102 replaces a first albedo map 434a with a first source albedo map 436a based on a perceptual distance of the first albedo map 434a and the first source albedo map 436a. Specifically, the first source albedo map 436a corresponds to a similar material as the material including the first albedo map 434a. For instance, if the first source albedo map 436a includes a particular wood grain for texturing floor objects, the material replacement system 102 selects the first source albedo map 436a based on the first source albedo map 436a including a similar wood grain or other perceptually similar texture. The material replacement system 102 then replaces the first albedo map 434a with the first source albedo map 436a in the digital scene 430.

In one or more embodiments, the material replacement system 102 replaces texture maps in a digital scene via a material graph associated with the digital scene. FIG. 4F illustrates an embodiment of a material graph 438 associated with a digital scene. In particular, the material graph 438 includes a plurality of nodes connected based on the desired material. As illustrated, a material includes a variety of different parameters that cause the material to react differently to light in ray-tracing simulations.

For example, the material graph 438 includes a BSDF node 440 that receives as inputs a plurality of texture nodes 442a-442d that define certain attributes of the material. To illustrate, an albedo node 442a corresponds to a base color of the material, a specular node 442b corresponds to a specularity of the material, a roughness node 442c corresponds to a roughness of the material, and a normal node 442d corresponds to a normal of the material. In one or more embodiments, each texture node provides an option to use a texture map that affects the corresponding texture parameter input to the BSDF node 440. In additional embodiments, each of the texture nodes 442a-442d and/or the BSDF node 440 include additional modifiable parameters that affect the overall material.

As FIG. 4F illustrates, the material graph 438 also includes a displacement node 442e that determines surface relief of an object (e.g., utilizing a displacement map) independently from the BSDF parameters of the BSDF node 440. Accordingly, the material graph 438 also includes a material output node 444 that combines the displacement map from the displacement node 442e with the BSDF parameters from the BSDF node 440. The material graph 438 thus provides a highly customizable visualization of material properties involving one or more types of texture maps for rendering objects in photorealistic three-dimensional scenes.

To modify the materials in a digital scene including a material graph, the material replacement system 102 swaps out the texture maps in the material graph with the perceptually similar texture maps from the source materials. For instance, the material replacement system 102 changes an albedo map in the albedo node 442a of the material graph 438 with a source albedo map. In additional embodiments in which the material replacement system 102 determines a plurality of texture maps (e.g., albedo map and specular map) to replace for a particular material in a digital scene, the material replacement system 102 swaps out each of the texture maps in the corresponding texture nodes of the material graph with the corresponding texture maps from the source material.

In one or more embodiments, the material replacement system 102 generates a plurality of different digital scenes based on an initial digital scene. Specifically, the material replacement system 102 determines a plurality of different source texture maps that are perceptually similar to (e.g., within a threshold distance of) each texture map in the initial digital scene. The material replacement system 102 then generates the different digital scenes by replacing the texture maps in the initial digital scene with different combinations of source texture maps from the source materials. In some instances, the material replacement system 102 also groups different source texture maps based on certain characteristics (e.g., color schemes, texture schemes) to produce a plurality of synthesized digital images with consistent replacement textures.

Figure 5A:
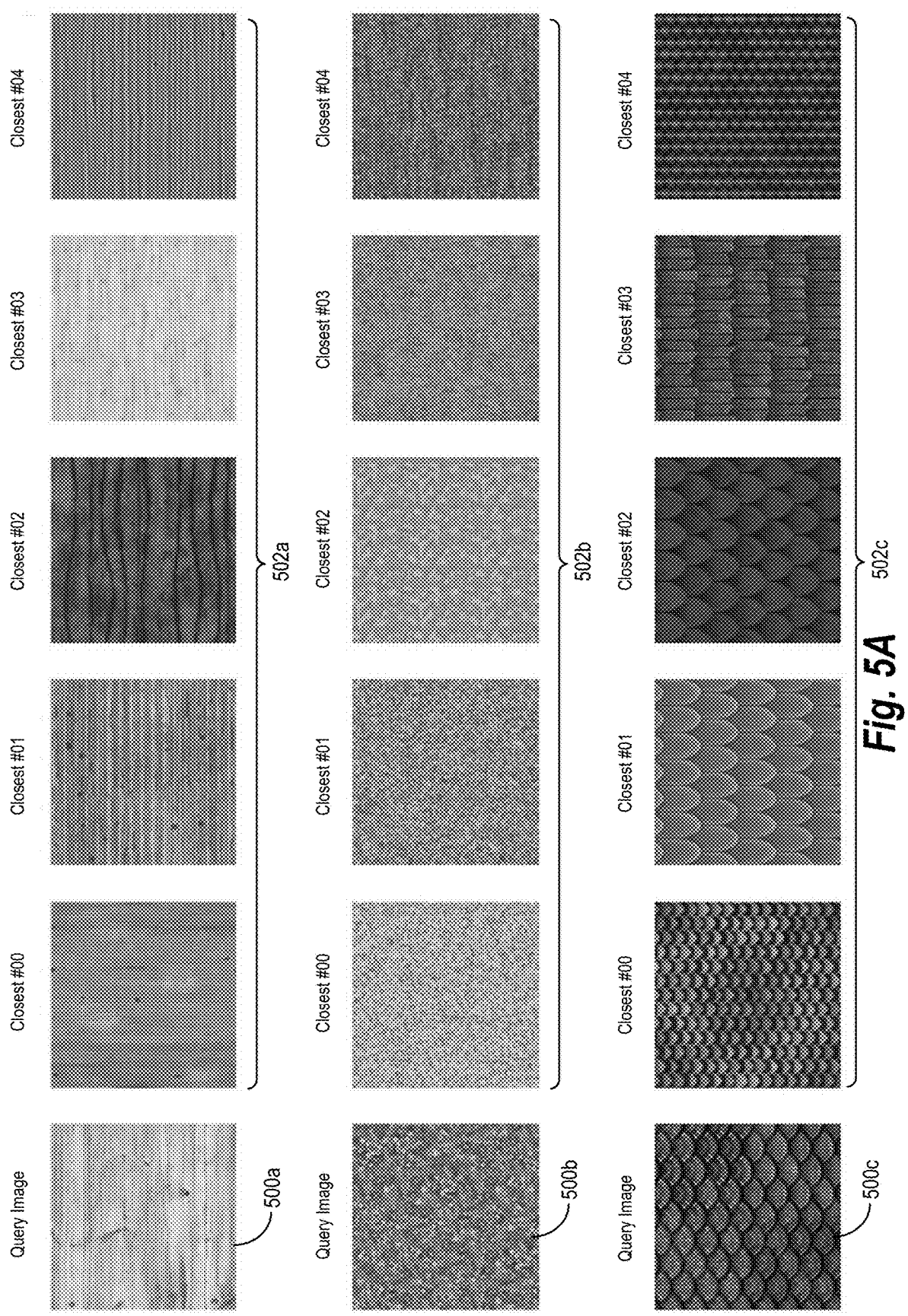
FIG. 5A illustrates diagrams of sets of texture maps that are visually similar in accordance with one or more implementations.

FIG. 5A illustrates a plurality of sample texture maps and a plurality of perceptually similar source texture maps based on perceptual distance. Specifically, FIG. 5A illustrates a first query image 500a (e.g., a first texture map) and a first set of corresponding texture maps 502a that are perceptually similar to the first query image 500a based on the similarity of the deep visual features of the first query image 500a and the first set of corresponding texture maps 502a. Additionally, FIG. 5A illustrates a second query image 500b and a second set of corresponding texture maps 502b that are perceptually similar to the second query image 500b. FIG. 5A further illustrates a third query image 500c and a second set of corresponding texture maps 502c that are perceptually similar to the third query image 500c. As illustrated, by utilizing a visual neural network to determine perceptual similarity between texture maps, the material replacement system 102 accurately determines visually similar textures from a set of source materials. For instance, the material replacement system 102 determines similar brick patterns, flooring patterns, tiling patterns, etc.

As mentioned, the material replacement system 102 generates variants of source texture maps for use in replacing texture maps in a digital scene. FIG. 5B illustrates a comparison of the material replacement system 102 replacing a particular texture of an object with a source texture map or a modified texture map. In particular, FIG. 5B illustrates a source albedo map 504a that the material replacement system 102 selects from a set of source materials for replacing an albedo map in a digital scene. Additionally, FIG. 5B illustrates a digital scene 506a including the source albedo map 504a. As shown, by inserting the source albedo map 504a into the digital scene 506a without modifying the scale or orientation of the source albedo map 504a, the resulting textured surface is not consistent with the aesthetic of the digital scene 506a (e.g., the texture is too large and of poor quality).

FIG. 5B also illustrates that the material replacement system 102 generates a modified albedo map 504b from the source albedo map 504a. Specifically, the material replacement system 102 modifies a scale of the source albedo map 504a and generates the modified albedo map 504b as a tiled version of the source albedo map 504a. Accordingly, the modified albedo map 504b includes a higher number of small texture patterns from the source albedo map 504a. FIG. 5B illustrates a digital scene 506b including the modified albedo map 504b. As illustrated, the resulting material based on the modified albedo map 504b has a better quality and is more consistent with the overall aesthetic of the digital scene 506b. The material replacement system 102 determines to use the modified albedo map 504b based on the generated deep visual features of the modified albedo map 504b being closer to the deep visual features of the original albedo map than the deep visual features of the source albedo map 504a.

Figure 6:
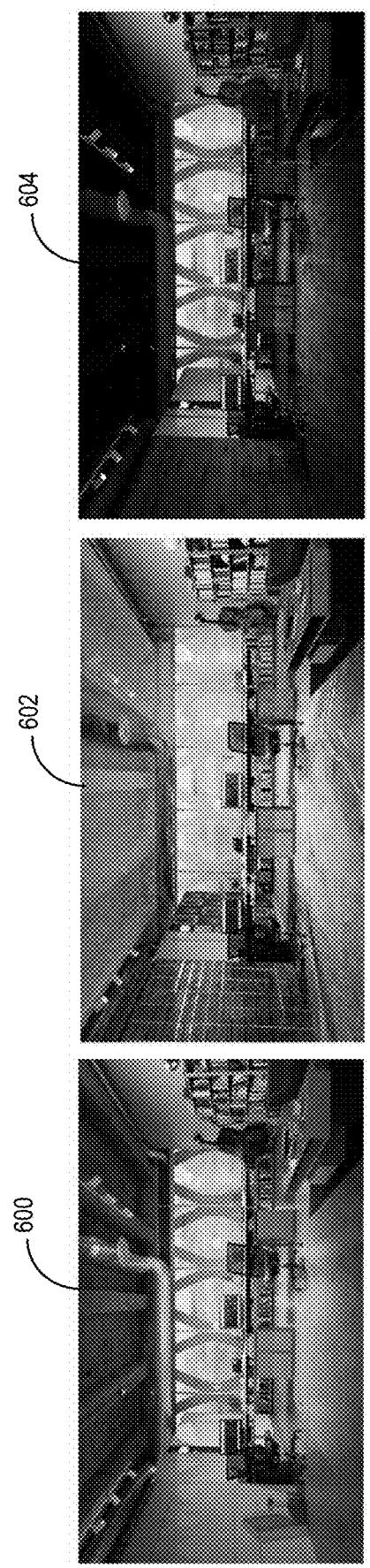
FIG. 6 illustrates a comparison of three-dimensional scenes with different materials in accordance with one or more implementations.

FIG. 6 illustrates a comparison of the results of the material replacement system 102 replacing materials in a digital scene 600 and a conventional system replacing materials in the digital scene 600. In particular, the conventional system replaces materials in the digital scene 600 with randomly selected textures from a plurality of source textures. As illustrated in FIG. 6, the conventional system creates a first modified digital scene 602 in which the textures are not perceptually similar to the original textures, and thus results in textures that are also not aesthetically consistent for the scene. Additionally, the conventional system does not account for varying sizes of certain object surfaces (e.g., the floor), resulting in texture details that are large and of poor quality. By utilizing a visual neural network to generate deep visual features for materials in connection with finding perceptually similar replacement materials, however, the material replacement system 102 generates a second modified digital scene 604 that is both consistent with the digital scene 600 and aesthetically consistent for the scene as a whole.

Figure 7:
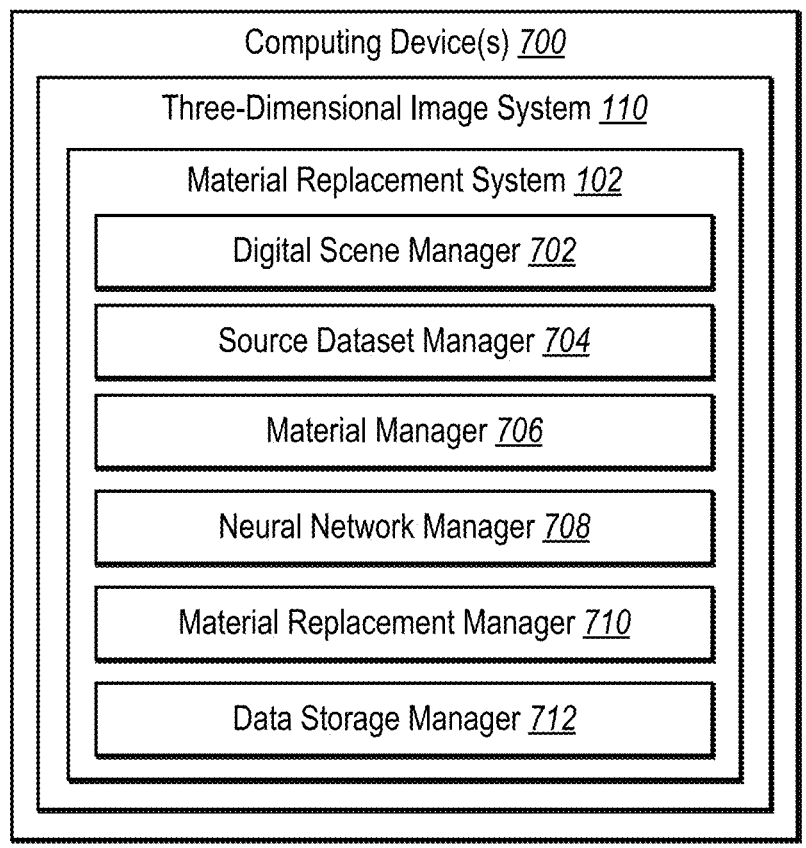
FIG. 7 illustrates a diagram of the material replacement system of FIG. 1 in accordance with one or more implementations.

FIG. 7 illustrates a detailed schematic diagram of an embodiment of the material replacement system 102 described above. As shown, the material replacement system 102 is implemented in a three-dimensional image system 110 on computing device(s) 700 (e.g., a client device and/or server device as described in FIG. 1, and as further described below in relation to FIG. 9). Additionally, the material replacement system 102 includes, but is not limited to, a digital scene manager 702, a source dataset manager 704, a material manager 706, a neural network manager 708, a material replacement manager 710, and a data storage manager 712. The material replacement system 102 can be implemented on any number of computing devices. For example, the material replacement system 102 can be implemented in a distributed system of server devices for editing three-dimensional scenes. The material replacement system 102 can also be implemented within one or more additional systems. Alternatively, the material replacement system 102 can be implemented on a single computing device such as a single client device.

In one or more embodiments, each of the components of the material replacement system 102 is in communication with other components using any suitable communication technologies. Additionally, the components of the material replacement system 102 are capable of being in communication with one or more other devices including other computing devices of a user, server devices (e.g., cloud storage devices), licensing servers, or other devices/systems. It will be recognized that although the components of the material replacement system 102 are shown to be separate in FIG. 7, any of the subcomponents may be combined into fewer components, such as into a single component, or divided into more components as may serve a particular implementation. Furthermore, although the components of FIG. 7 are described in connection with the material replacement system 102, at least some of the components for performing operations in conjunction with the material replacement system 102 described herein may be implemented on other devices within the environment.

In some embodiments, the components of the material replacement system 102 include software, hardware, or both. For example, the components of the material replacement system 102 include one or more instructions stored on a computer-readable storage medium and executable by processors of one or more computing devices (e.g., the computing device(s) 700). When executed by the one or more processors, the computer-executable instructions of the material replacement system 102 cause the computing device(s) 700 to perform the operations described herein. Alternatively, the components of the material replacement system 102 can include hardware, such as a special purpose processing device to perform a certain function or group of functions. Additionally, or alternatively, the components of the material replacement system 102 can include a combination of computer-executable instructions and hardware.

Furthermore, the components of the material replacement system 102 performing the functions described herein with respect to the material replacement system 102 may, for example, be implemented as part of a stand-alone application, as a module of an application, as a plug-in for applications, as a library function or functions that may be called by other applications, and/or as a cloud-computing model. Thus, the components of the material replacement system 102 may be implemented as part of a stand-alone application on a personal computing device or a mobile device. Alternatively, or additionally, the components of the material replacement system 102 may be implemented in any application that provides digital image modification, including, but not limited to ADOBE® SUBSTANCE DESIGNER. "ADOBE" and "SUBSTANCE DESIGNER," are either registered trademarks or trademarks of Adobe Inc. in the United States and/or other countries.

The material replacement system 102 includes a digital scene manager 702 to manage digital scenes. For example, the digital scene manager 702 manages assignments between objects and materials in three-dimensional scenes in three-dimensional environments. In one or more embodiments, the digital scene manager 702 accesses digital scenes from one or more sources including local storage device(s), third-party systems, content creator devices, or other sources.

The material replacement system 102 also includes a source dataset manager 704 to manage a source dataset. For instance, the source dataset manager 704 accesses a plurality of source materials including three-dimensional scenes having a variety of different objects and object layouts and a variety of different object-material assignments. In one or more embodiments, the source dataset manager 704 accesses a source dataset from a source repository, a third-party system, or from a plurality of different sources. In other embodiments, the source dataset manager 704 includes a source repository including a source dataset.

As illustrated, the material replacement system 102 includes a material manager 706 to manage materials in digital scenes and source materials. For example, the material manager 706 extracts materials and texture maps from digital scenes. In one or more embodiments, the material manager 706 also extracts materials and texture maps form source digital scenes. In some embodiments, the material manager 706 generates variants of materials such as by modifying parameterized characteristics of materials or by generating tiled variants of materials.

The material replacement system 102 also includes a neural network manager 708 to generate deep visual features of materials or texture maps. Specifically, the neural network manager 708 utilizes a visual neural network to generate deep visual features of texture maps in a digital scene. The neural network manager 708 also utilizes the visual neural network to generate source deep visual features of source texture maps in source materials. The neural network manager 708 can also manage training or fine-tuning of the visual neural network.

In one or more embodiments, the material replacement system 102 includes a material replacement manager 710 to manage replacement of materials in a digital scene. For instance, the material replacement manager 710 determines source materials from source materials that are perceptually similar to materials in a digital scene. To illustrate, the material replacement manager 710 determines visual similarity metrics by comparing deep visual features of materials to source deep visual features of source materials. The material replacement manager 710 also replaces materials in a digital scene by updating a material graph or other scene data structure associated with the digital scene with replacement materials.

The material replacement system 102 also includes a data storage manager 712 (that comprises a non-transitory computer memory/one or more memory devices) that stores and maintains data associated with three-dimensional scenes. For example, the data storage manager 712 stores data associated with objects and materials in digital images and source materials. Additionally, the data storage manager 712 stores deep visual features representing materials in digital scenes and visual similarity metrics comparing deep visual features.

Figure 8:
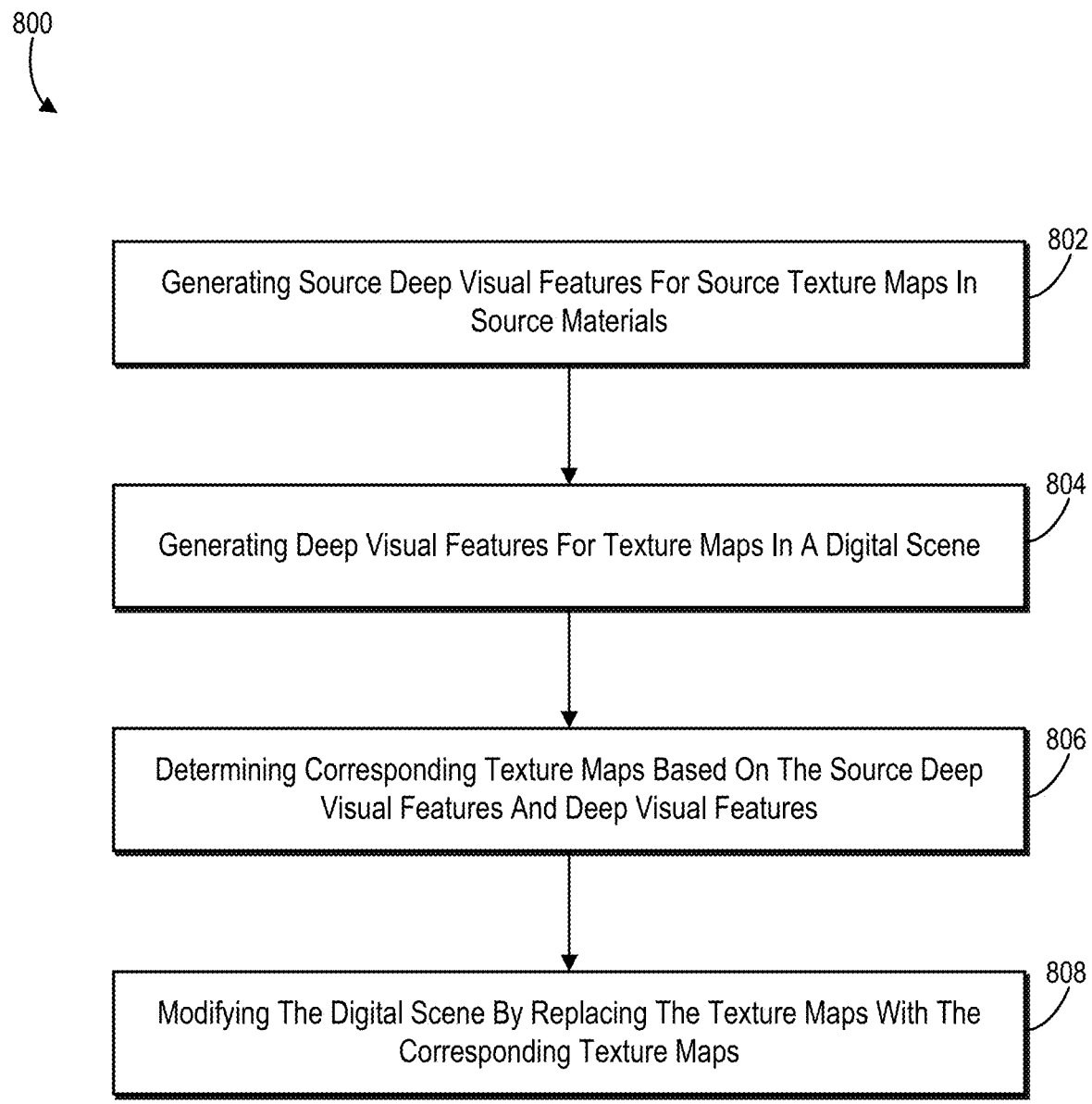
FIG. 8 illustrates a flowchart of a series of acts for modifying a digital scene utilizing a visual neural network to identify visually similar materials from a source dataset in accordance with one or more implementations.

Turning now to FIG. 8, this figure shows a flowchart of a series of acts 800 of modifying a digital scene utilizing a visual neural network to identify visually similar materials from a source dataset. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8.

As shown, the series of acts 800 includes an act 802 of generating source deep visual features for source texture maps in source materials. For example, act 802 involves generating, utilizing a visual neural network, source deep visual features for source texture maps of objects in a plurality of source materials. Act 802 can involve extracting source albedo maps from materials of the objects in the plurality of source materials. Act 802 can then involve generating, utilizing the visual neural network, the source deep visual features for the source albedo maps.

The series of acts 800 also includes an act 804 of generating deep visual features for texture maps in a digital scene. For example, act 804 involves generating, utilizing the visual neural network, a plurality of deep visual features for a plurality of texture maps of a plurality of objects in the digital scene. Act 804 can involve extracting one or more albedo maps from one or more materials of the one or more objects. For instance, act 804 can involve extracting the plurality of albedo maps from the plurality of materials of the plurality of objects in the digital scene by recursively tracing a plurality of material nodes of a material graph associated with the digital scene to determine the plurality of albedo maps. Act 804 can then involve generating the one or more deep visual features from the one or more albedo maps extracted from the one or more materials of the one or more objects.

Additionally, the series of acts 800 includes an act 806 of determining corresponding texture maps based on the source deep visual features and deep visual features. For example, act 806 involves determining a plurality of corresponding texture maps from the source texture maps by comparing the source deep visual features and the plurality of deep visual features. Specifically, act 806 can involve determining one or more corresponding texture maps from a set of source texture maps extracted from a plurality of source materials based on the one or more deep visual features and source deep visual features representing the set of source texture maps in the plurality of source materials.

Act 806 can involve determining a particular corresponding texture map from the set of source texture maps by comparing a source deep visual feature of the particular corresponding texture map to the one or more deep visual features. Act 806, or another act, can also involve generating one or more variant texture maps by modifying one or more characteristics of the particular corresponding texture map. Act 806 can also involve determining the one or more corresponding texture maps comprising the particular corresponding texture map and the one or more variant texture maps.

Act 806 can involve determining a plurality of visual similarity metrics for the set of source texture maps by comparing the source deep visual features to a deep visual feature of a particular texture map of the digital scene. For instance, act 806 can involve determining visual similarity metrics indicating perceptual distances between a particular texture map of the plurality of texture maps of the digital scene and the source texture maps based on a deep visual feature of the particular texture map. For example, act 806 can involve determining a first Euclidean distance between a first source deep visual feature of a first source texture map and the deep visual feature of the particular texture map. Act 806 can also involve determining a second Euclidean distance between a second deep visual feature of a second source texture map and the deep visual feature of the particular texture map. Act 806 can then involve selecting the one or more corresponding texture maps based on the plurality of visual similarity metrics for the set of source texture maps.

Furthermore, the series of acts 800 includes an act 808 of modifying the digital scene by replacing the texture maps with the corresponding texture maps. For example, act 808 involves modifying the digital scene by replacing the plurality of texture maps of the plurality of objects in the digital scene with the plurality of corresponding texture maps. Act 808 can involve replacing the one or more albedo maps from the one or more materials of the one or more objects with the one or more corresponding texture maps from the set of source texture maps.

Act 808 can involve generating a plurality of digital scenes comprising a plurality of different texture maps for the one or more objects by replacing a particular texture map of the one or more texture maps with at least two different corresponding texture maps of the one or more corresponding texture maps.

Act 808 can also involve generating a modified texture map of a corresponding texture map of the one or more corresponding texture maps by modifying a scale or an orientation of the corresponding texture map. Act 808 can then involve replacing a texture map of an object in the digital scene with the modified texture map comprising a modified scale or a modified orientation. For example, act 808 can involve generating, utilizing the visual neural network, a deep visual feature for the modified texture map and replacing a particular texture map of the one or more texture maps with the modified texture map based on the deep visual feature of the modified texture map.

Act 808 can involve generating a plurality of modified texture maps of a corresponding texture map of the one or more corresponding texture maps by modifying a scale or an orientation of the corresponding texture map. Act 808 can also involve generating deep visual features for the plurality of modified texture maps. Act 808 can then involve selecting a particular modified texture map from the plurality of modified texture maps based on a deep visual feature of the particular modified texture map.

Act 808 can also involve replacing a texture map of an object in the digital scene with a plurality of corresponding texture maps from the plurality of source texture maps. Act 808 can then involve generating a plurality of digital images comprising the plurality of corresponding texture maps for the object.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
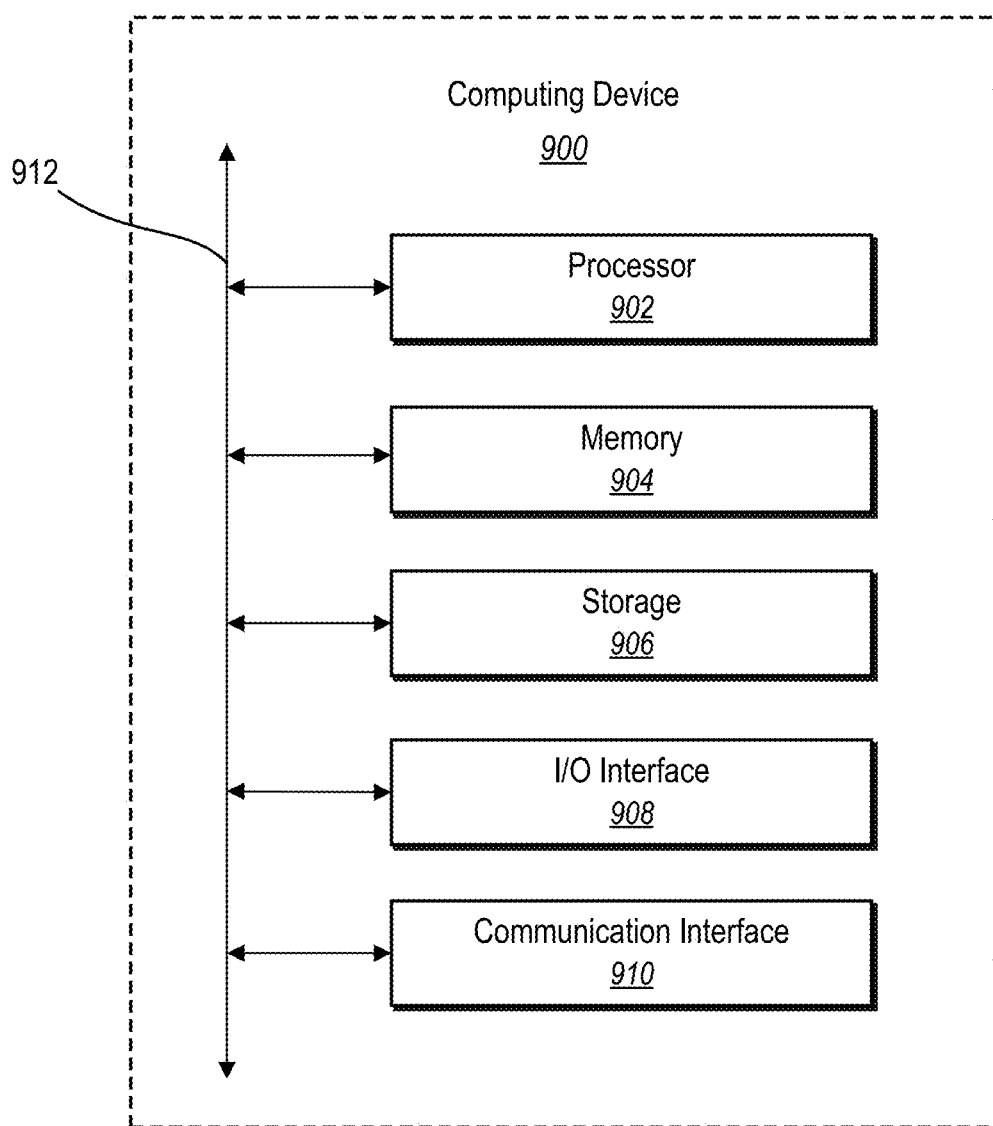
FIG. 9 illustrates a block diagram of an exemplary computing device in accordance with one or more embodiments.

FIG. 9 illustrates a block diagram of exemplary computing device 900 that may be configured to perform one or more of the processes described above. One will appreciate that one or more computing devices such as the computing device 900 may implement the system(s) of FIG. 1. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 900 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example, and not by way of limitation, to execute instructions for dynamically modifying workflows, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions for performing the methods described herein.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example, and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
generating, utilizing a visual neural network, one or more deep visual features for one or more texture maps of one or more objects in a digital scene;
determining, by at least one processor, one or more corresponding texture maps from a set of source texture maps extracted from a plurality of source materials based on the one or more deep visual features and source deep visual features representing the set of source texture maps in the plurality of source materials; and
modifying, by the at least one processor, the digital scene by replacing the one or more texture maps of the one or more objects in the digital scene with the one or more corresponding texture maps.

2. The computer-implemented method as recited in claim 1, wherein generating the one or more deep visual features for the one or more texture maps of the one or more objects in the digital scene comprises:
extracting one or more albedo maps from one or more materials of the one or more objects; and
generating the one or more deep visual features from the one or more albedo maps extracted from the one or more materials of the one or more objects.

3. The computer-implemented method as recited in claim 2, wherein replacing the one or more texture maps of the one or more objects in the digital scene comprises replacing the one or more albedo maps from the one or more materials of the one or more objects with the one or more corresponding texture maps from the set of source texture maps.

4. The computer-implemented method as recited in claim 1, further comprising:
extracting the set of source texture maps from procedural source materials; and
generating, utilizing the visual neural network, the source deep visual features representing the set of source texture maps.

5. The computer-implemented method as recited in claim 4, wherein determining the one or more corresponding texture maps from the set of source texture maps comprises:
determining a particular corresponding texture map from the set of source texture maps by comparing a source deep visual feature of the particular corresponding texture map to the one or more deep visual features;
generating one or more variant texture maps by modifying one or more characteristics of the particular corresponding texture map; and
determining the one or more corresponding texture maps comprising the particular corresponding texture map and the one or more variant texture maps.

6. The computer-implemented method as recited in claim 1, wherein modifying the digital scene comprises generating a plurality of digital scenes comprising a plurality of different texture maps for the one or more objects by replacing a particular texture map of the one or more texture maps with at least two different corresponding texture maps of the one or more corresponding texture maps.

7. The computer-implemented method as recited in claim 1, wherein determining the one or more corresponding texture maps further comprises:
determining a plurality of visual similarity metrics for the set of source texture maps by comparing the source deep visual features to a deep visual feature of a particular texture map of the digital scene; and
selecting the one or more corresponding texture maps based on the plurality of visual similarity metrics for the set of source texture maps.

8. The computer-implemented method as recited in claim 7, wherein determining the plurality of visual similarity metrics for the set of source texture maps comprises:
determining a first distance between a first source deep visual feature of a first source texture map and the deep visual feature of the particular texture map; and
determining a second distance between a second deep visual feature of a second source texture map and the deep visual feature of the particular texture map.

9. The computer-implemented method as recited in claim 1, wherein modifying the digital scene further comprises:
generating a modified texture map of a corresponding texture map of the one or more corresponding texture maps by modifying a scale or an orientation of the corresponding texture map; and replacing a texture map of an object in the digital scene with the modified texture map comprising a modified scale or a modified orientation.

10. The computer-implemented method as recited in claim 1, wherein modifying the digital scene further comprises:
generating a plurality of modified texture maps of a corresponding texture map of the one or more corresponding texture maps by modifying a scale or an orientation of the corresponding texture map;
generating deep visual features for the plurality of modified texture maps; and
selecting a particular modified texture map from the plurality of modified texture maps based on a deep visual feature of the particular modified texture map.

11. A system comprising:
one or more computer memory devices comprising a digital scene and a plurality of source materials; and
one or more servers configured to cause the system to:
generate, utilizing a visual neural network, source deep visual features for source texture maps of a plurality of source materials;
generate, utilizing the visual neural network, a plurality of deep visual features for a plurality of texture maps of a plurality of objects in the digital scene;
determine a plurality of corresponding texture maps from the source texture maps by comparing the source deep visual features and the plurality of deep visual features; and
modify the digital scene by replacing the plurality of texture maps of the plurality of objects in the digital scene with the plurality of corresponding texture maps.

12. The system as recited in claim 11, wherein the one or more servers are further configured to cause the system to generate the source deep visual features for the source texture maps of the plurality of objects in the plurality of source materials by:
extracting source albedo maps from materials of the plurality of objects in the plurality of source materials; and
generating, utilizing the visual neural network, the source deep visual features for the source albedo maps.

13. The system as recited in claim 11, wherein the one or more servers are further configured to cause the system to generate the plurality of deep visual features for the plurality of texture maps of the plurality of objects in the digital scene by:
extracting a plurality of albedo maps from a plurality of materials of the plurality of objects in the digital scene; and
generate, utilizing the visual neural network, the plurality of deep visual features for the plurality of albedo maps.

14. The system as recited in claim 13, wherein the one or more servers are further configured to cause the system to extract the plurality of albedo maps from the plurality of materials of the plurality of objects in the digital scene by recursively tracing a plurality of material nodes of a material graph associated with the digital scene to determine the plurality of albedo maps.

15. The system as recited in claim 11, wherein the one or more servers are further configured to cause the system to determine the plurality of corresponding texture maps from the source texture maps by:
determining visual similarity metrics indicating perceptual distances between a particular texture map of the plurality of texture maps of the digital scene and the source texture maps based on a deep visual feature of the particular texture map; and
selecting the plurality of corresponding texture maps based on the visual similarity metrics.

16. The system as recited in claim 11, wherein the one or more servers are further configured to cause the system to determine the plurality of corresponding texture maps from the source texture maps by:
generating a variant texture map for a particular source texture map of the source texture maps by modifying characteristics of the particular source texture map;
selecting the particular source texture map based on a source deep visual feature of the particular source texture map; and
determining the plurality of corresponding texture maps comprising the particular source texture map and the variant texture map.

17. A non-transitory computer readable storage medium comprising instructions that, when executed by at least one processor, cause a computing device to:
generate, utilizing a visual neural network, source deep visual features for a plurality of source texture maps from a plurality of source materials;
generate, utilizing the visual neural network, one or more deep visual features for one or more texture maps of one or more objects in a digital scene;
determine one or more visual similarity metrics by comparing the one or more deep visual features and the plurality of source texture maps;
select one or more corresponding texture maps from the plurality of source texture maps based on the one or more visual similarity metrics; and
modify the digital scene by replacing the one or more texture maps of the one or more objects in the digital scene with the one or more corresponding texture maps.

18. The non-transitory computer readable storage medium as recited in claim 17, further comprising instructions that, when executed by the at least one processor, cause the computing device to:
generate the source deep visual features for a plurality of source albedo maps extracted from the plurality of source materials; and
generate the one or more deep visual features for one or more albedo maps extracted from one or more materials of the one or more objects in the digital scene.

19. The non-transitory computer readable storage medium as recited in claim 17, further comprising instructions that, when executed by the at least one processor, cause the computing device to modify the digital scene by:
generating a modified texture map for a corresponding texture map of the one or more corresponding texture maps by modifying a scale or an orientation of the corresponding texture map;
generating, utilizing the visual neural network, a deep visual feature for the modified texture map; and
replacing a particular texture map of the one or more texture maps with the modified texture map based on the deep visual feature of the modified texture map.

20. The non-transitory computer readable storage medium as recited in claim 17, further comprising instructions that, when executed by the at least one processor, cause the computing device to modify the digital scene by:
replacing a texture map of an object in the digital scene with a plurality of corresponding texture maps from the plurality of source texture maps; and generating a plurality of digital images comprising the plurality of corresponding texture maps for the object.

* * * * *